(12) United States Patent
Ko et al.

(10) Patent No.: US 12,051,248 B2
(45) Date of Patent: Jul. 30, 2024

(54) MOVING BODY COLLISION AVOIDANCE DEVICE, COLLISION AVOIDANCE METHOD AND ELECTRONIC DEVICE

(71) Applicant: THINKWARE CORPORATION, Seongnam-si (KR)

(72) Inventors: Suk Pil Ko, Seongnam-si (KR); Young Yong Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 304 days.

(21) Appl. No.: 17/499,141

(22) Filed: Oct. 12, 2021

(65) Prior Publication Data

US 2022/0114815 A1    Apr. 14, 2022

(30) Foreign Application Priority Data

Oct. 13, 2020 (KR) .................. 10-2020-0132140
Oct. 12, 2021 (KR) .................. 10-2021-0135321

(51) Int. Cl.
G06V 20/58 (2022.01)
B60T 7/22 (2006.01)
G06T 7/277 (2017.01)
G06V 10/94 (2022.01)

(52) U.S. Cl.
CPC ................ *G06V 20/58* (2022.01); *B60T 7/22* (2013.01); *G06T 7/277* (2017.01); *G06V 10/95* (2022.01); *G06T 2207/30261* (2013.01)

(58) Field of Classification Search
CPC .......... G06V 20/58; G06V 10/95; B60T 7/22; G06T 7/277; G06T 2207/30261
USPC ........................................... 701/93
See application file for complete search history.

(56) References Cited

U.S. PATENT DOCUMENTS

| | | | |
|---|---|---|---|
| 2019/0291728 A1* | 9/2019 | Shalev-Shwartz | ............................ B60W 30/18163 |
| 2020/0086864 A1* | 3/2020 | Rajendra Zanpure | .... G06T 7/70 |
| 2021/0150230 A1* | 5/2021 | Smolyanskiy | ......... G06V 20/56 |
| 2021/0179123 A1* | 6/2021 | Yamada | ..................... B60T 8/96 |
| 2022/0058400 A1* | 2/2022 | Bianconcini | ............ G06T 7/521 |

FOREIGN PATENT DOCUMENTS

KR         20200075066 A   *  6/2020

* cited by examiner

*Primary Examiner* — Isaac G Smith
(74) *Attorney, Agent, or Firm* — WHDA, LLP

(57) ABSTRACT

There is provided a collision avoidance method of a moving body collision avoidance device including acquiring a driving image of the moving body, recognizing an object in the acquired driving image using a neural network model, calculating a relative distance between the moving body and the object based on the recognized object, calculating a required collision time between the object and the moving body based on the calculated relative distance, and controlling an operation of the moving body based on the calculated required collision time.

16 Claims, 15 Drawing Sheets

MOVING BODY COLLISION AVOIDANCE DEVICE, COLLISION AVOIDANCE METHOD AND ELECTRONIC DEVICE

CROSS-REFERENCE TO RELATED APPLICATION

This application claims the priority and benefit of Korean Patent Application No. 10-2020-0132140 filed on Oct. 13, 2020 and Korean Patent Application No. 10-2021-0135321 filed on Oct. 12, 2021, with the Korean Intellectual Property Office, the disclosure of which is incorporated herein by reference.

BACKGROUND OF THE INVENTION

1. Field of the Invention

The present invention relates to a moving body collision avoidance device, a collision avoidance method, and an electronic device for reducing a collision accident of a moving body.

2. Description of the Related Art

Moving bodies such as automobiles, motorcycles, etc. may encounter various circumstances in the course of driving, so measures to reduce collision accidents of moving bodies have been actively discussed.

In addition, recently, personal mobility (PM) devices, such as an electric kickboard, electric bicycle, and ninebot-electric wheel, which is not only eco-friendly but also has strengths in parking and short-distance driving, has come to prominence as a means of transportation in the future.

As a utilization rate of such personal mobility has increased, a problem of personal mobility safety has emerged.

In particular, personal mobility is highly likely to be exposed to a collision accident with a car, motorcycle, person, etc., because it is driven on a road or sidewalk.

As such, a method for reducing collision accidents of moving bodies is required for the safety of users of various moving bodies.

SUMMARY

An aspect of the present invention may provide a moving body collision avoidance device, a collision avoidance method, and an electric device, capable of providing a collision warning guidance or controlling a moving body to be braked when there is a possibility of a collision based on a driving image of the moving body.

According to an aspect of the present invention, a collision avoidance method of a moving body collision avoidance device includes: acquiring a driving image of the moving body; recognizing an object in the acquired driving image using a neural network model; calculating a relative distance between the moving body and the object based on the recognized object; calculating a required collision time between the object and the moving body based on the calculated relative distance; and controlling an operation of the moving body based on the calculated required collision time.

Also, the neural network model may recognize the object in the driving image and classify and output a bounding box indicating an object region in the driving image and the object in the bounding box.

In addition, the collision avoidance method may further include: tracking a change in position of an object recognized in the driving image and tracking a movement of the object.

Also, the collision avoidance method may further include: normalizing the driving image in which the object is recognized.

In addition, the collision avoidance method may further include: determining a position state of objects recognized in the driving image and determining an object to be tracked among the objects recognized in the driving image based on the position state according to types of the objects.

Also, the calculating of the relative distance may include generating a virtual horizontal line in the driving image based on the bounding box.

In addition, the calculating of the relative distance may include calculating an estimated relative distance based on the generated virtual horizontal line and a vertical coordinate of a bottom surface of the bounding box.

In addition, the calculating of the relative distance may include calculating the estimated relative distance based on a vertical height of the bounding box and an actual height of the object.

In addition, the calculating of the relative distance may include calculating the relative distance through prediction and updating by applying the calculated estimated relative distance to a Kalman filter.

The calculating of the required collision time may include calculating the required collision time in consideration of a speed of the moving body.

In addition, the controlling of the operation may include providing a collision warning guidance or control the moving body to be braked when there is a possibility of colliding with the object.

According to another aspect of the present invention, a moving body collision avoidance device includes: an image acquiring unit acquiring a driving image of the object; an object recognizing unit recognizing an object in the acquired driving image using a neural network model; a calculating unit calculating a relative distance between the moving body and the object based on the recognized object and calculating a required collision time between the object and the moving body based on the calculated relative distance; and a controller controlling an operation of the moving body based on the calculated required collision time.

In addition, the neural network model may recognize an object in the driving image and classify and output a bounding box indicating an object region in the driving image and an object in the bounding box.

The moving body collision avoidance device may further include: an object tracking unit tracking a change in position of an object recognized in the driving image to track a movement of the object.

The moving body collision avoidance device may further include: a position state determining unit determining a position state of the object recognized in the driving image; and a tracking determining unit excluding an object having a low possibility of colliding with the moving body from a tracking target based on the position state according to a type of the object.

Also, the calculating unit may generate a virtual horizontal line in the driving image based on the bounding box.

In addition, the calculating unit may calculate an estimated relative distance based on the generated virtual horizontal line and a vertical coordinate of a bottom surface of the bounding box.

Also, the calculating unit may calculate an estimated relative distance based on a vertical height of the bounding box and an actual height of the object.

In addition, the calculating of the relative distance may include calculating the relative distance through prediction and updating by applying the calculated estimated relative distance to a Kalman filter.

In addition, the calculating unit may calculate the required collision time in consideration of a speed of the moving body.

According to another aspect of the present invention, an electronic device for a moving body includes: an image capturing unit capturing a driving image of the moving body; an image acquiring unit acquiring a driving image captured by the image capturing unit; a recognizing unit recognizing an object in the acquired driving image using a neural network model; a calculating unit calculating a relative distance between the moving body and the object based on the recognized object and calculating a required collision time between the object and the moving body based on the calculated relative distance; and an output unit outputting information for guiding driving of the moving body based on the calculated required collision time.

According to another aspect of the present invention, a program code for executing the collision avoidance method described above may be recorded in a program according to an exemplary embodiment of the present invention.

According to the present invention, a possibility of a collision may be determined from a driving image, and when the possibility of a collision is high, a collision warning guidance may be provided or a moving body may be controlled to be braked.

In addition, in the present invention, a cause of loss, damage, a collision accident, etc. of a moving body may be investigated through event information.

BRIEF DESCRIPTION OF DRAWINGS

FIGS. 3A and 3B to 6 are views illustrating a driving image of a moving body according to an exemplary embodiment of the present invention.

DETAILED DESCRIPTION

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The above-mentioned objects, features, and advantages will become obvious from the following detailed description provided in relation to the accompanying drawings. Therefore, those skilled in the art to which the present invention pertains may easily practice a technical idea of the present invention.

Further, in describing the present invention, in the case in which it is judged that a detailed description of a well-known technology associated with the present invention may unnecessarily make unclear the gist of the present invention, it will be omitted. Hereinafter, various exemplary embodiments of the present invention will be described in detail with reference to the accompanying drawings.

Figure 1:
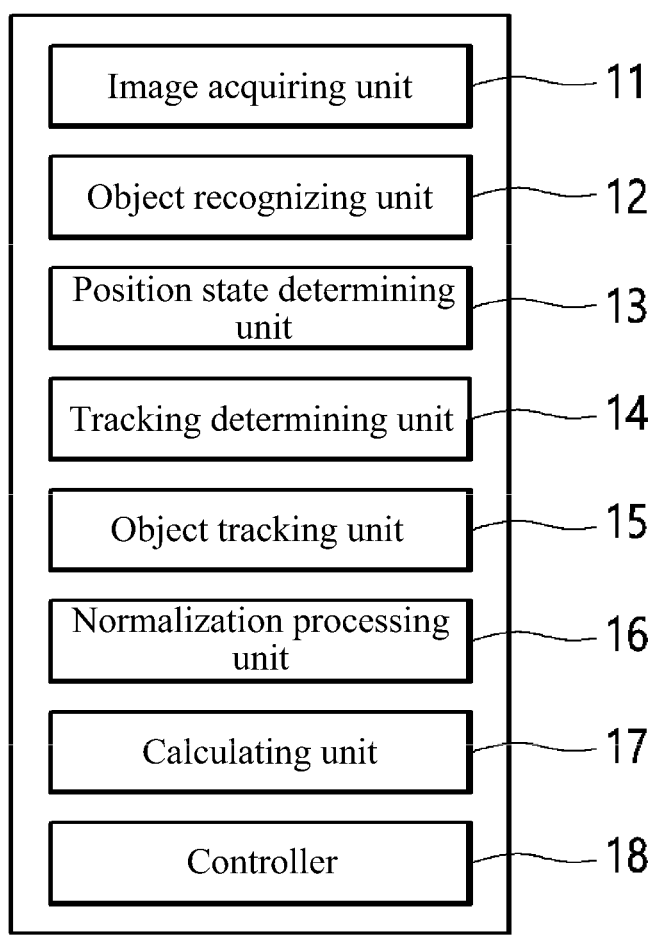
FIG. 1 is a block diagram illustrating a moving body collision avoidance device according to an exemplary embodiment of the present invention.

FIG. 1 is a block diagram illustrating a moving body collision avoidance device according to an exemplary embodiment of the present invention.

Referring to FIG. 1, a collision avoidance device 10 of a moving body 200 may include an image acquiring unit 11, an object recognizing unit 12, a position state determining unit 13, a tracking determining unit 14, an object tracking unit 15, a normalization processing unit 16, a calculating unit 17, and a controller 18. The moving body 10 may provide various guidance or control for preventing a collision of the moving body based on a driving image captured by an image capturing device of the moving body 200 or a separate image capturing device.

Here, the moving body is an object that is movable and requires guidance, and may be, for example, a person, a dog, a vehicle, a motorcycle, a bicycle, a personal mobility, and the like. Hereinafter, for convenience of description, each component module constituting the collision avoidance device 10 is described in detail by taking a case in which the moving body is implemented as personal mobility, as an example.

The image acquiring unit 11 may acquire a driving image captured by an internal image capturing device of the moving body or a separate image capturing device. For example, the image acquiring unit 11 may acquire in real time a driving image captured by an image capturing device installed in the moving body, while the moving body is traveling. As another example, the image acquiring unit 11 may acquire a driving image captured by an image capturing device of the user (e.g., an image capturing device installed on a wearer's helmet, an image capturing device held by the wearer's hand, etc.), while the moving body is traveling.

Here, the acquired driving image may include various objects such as pedestrians, motorcycles, vehicles, and obstacles in a sidewalk or road according to a driving environment of the moving body.

The object recognizing unit 12 may recognize objects in the driving image obtained based on a neural network model.

Specifically, the object recognizing unit 12 may input the acquired driving image to the neural network model in units of frames and acquire a driving image including a bounding box indicating an object region in the driving image and type information of the object in the bounding box. Here, the neural network model may be, for example, a single shot multi-box detector (SSD) algorithm as an object recognition model based on a CNN network. This will be described with reference to FIGS. 2 and 3.

Figure 2:
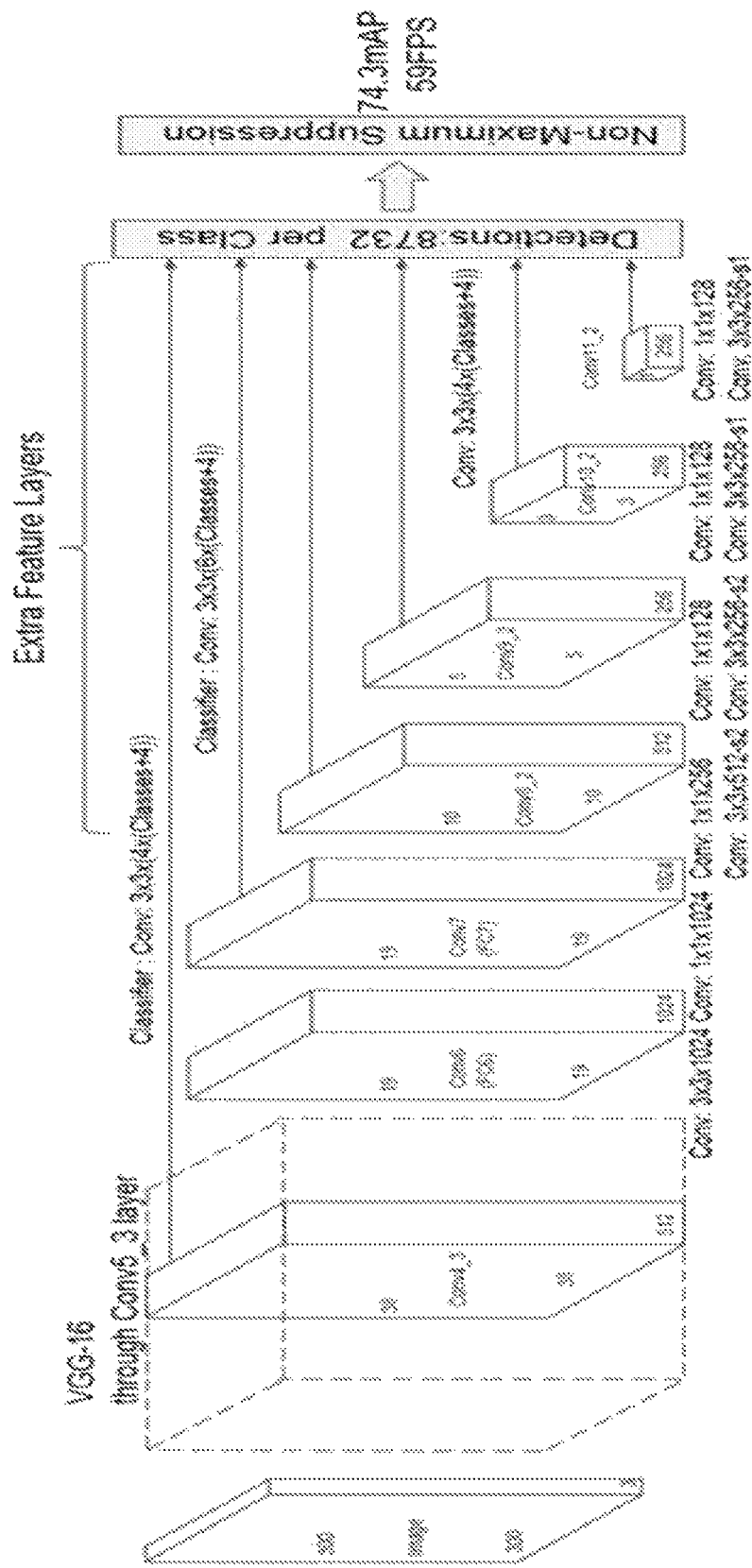
FIG. 2 is a diagram illustrating a structure of a neural network model according to an exemplary embodiment of the present invention.
Figure 3A:
Figure 3B:
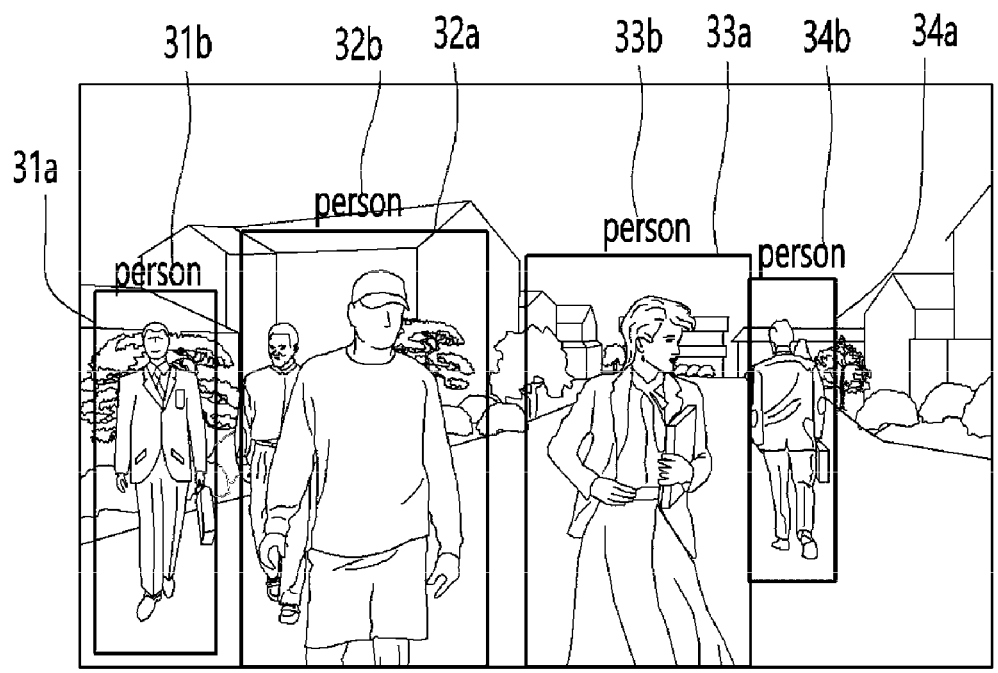

FIG. 2 is a view illustrating a structure of a neural network model according to an exemplary embodiment of the present invention. FIGS. 3A and 3B are views illustrating a driving image according to an exemplary embodiment of the present invention.

Referring to FIG. 2, the neural network model may extract a base feature by allowing an input driving image to pass through up to conv5_3 of a pre-trained VGG-16 model, perform a convolution operation on an extracted feature map and transmit the same to a next layer, and perform the convolution operation up to a 1×1 size feature map. Also, the neural network model performs object detection in the feature map on feature maps extracted from each layer using a detector and classifier, and outputs a feature map including bounding box coordinate information corresponding to an object in each feature map and type information classifying an object.

Thereafter, a driving image including one detection result may be finally output by applying non-maximum suppression (MNS) to the feature maps.

For example, referring to FIGS. 3A and 3B, when one frame of the driving image as shown in FIG. 3A is input to the neural network, the neural network may output a driving image including bounding boxes 31*a*, 32*a*, 33*a*, and 34*a* respectively corresponding to objects in the driving image and type information 31*b*, 32*b*, 33*b*, and 34*b* classifying objects as shown in FIG. 3B. Here, each bounding box includes coordinate information thereof.

That is, the neural network model may recognize the objects in the driving image and output the bounding boxes indicating object regions in the driving image and classification results for types of the objects in the corresponding bounding boxes.

Meanwhile, the bounding boxes and the type information of the objects in the bounding boxes of FIGS. 3A and 3B are an example and may be expressed to be different as necessary. In addition, the neural network model described above is an example, and various algorithms such as RefineDet and YOLO may be used in addition to the SSD algorithm.

Referring back to FIG. 1, the position state determining unit 13 may determine a position state of each object recognized in the driving image. In this case, the position state determining unit 13 may determine position states of the objects based on bounding box positions of the objects recognized in the driving image. Here, the position states of the objects indicate where the objects are located. For example, the position states may include a state in which the corresponding recognized object is located on a sidewalk, a state in which the corresponding recognized object is located on a road, a state in which the corresponding recognized object is located on an overpass, a state in which the corresponding recognized object is located on a building railing, etc.

Specifically, the position state determining unit 13 may determine the position states of the corresponding objects by comparing the positions of the bounding boxes of the recognized objects with respect to a virtual horizontal line in the driving image.

For example, the position state determining unit 13 may determine a position state of a corresponding object based on whether the bounding box of the recognized object is positioned on the left or right to a degree based on a center of the virtual horizontal line in the driving image, whether the bounding box of the recognized object is positioned above or below the virtual horizontal line in the driving image, or a ratio in which the bounding box of the recognized object is positioned on the virtual horizontal line in the driving image.

In addition, the position state determining unit 13 may determine a position state of a corresponding object based on a relative position difference between the bounding boxes of the recognized objects and other adjacent objects, among the objects recognized in the driving image.

The tracking determining unit 14 may determine a tracking target based on a position state according to the type of object.

Specifically, the tracking determining unit 14 may determine a possibility of colliding with a moving body based on the position state of the corresponding object according to the type of the recognized object, exclude an object having a low possibility of colliding with the moving body from a tracking target, and determine an object having a high possibility of a collision as a tracking target. In this case, the tracking determining unit 14 may determine the possibility of a collision in consideration of the current driving position of the moving body.

For example, when the type of moving body is a personal mobility, the tracking determining unit 14 may determine that a possibility of a collision of a vehicle located on a road, among the objects recognized in the driving image, is low and may exclude the object from the tracking target.

As another example, when the type of moving body is a vehicle, the tracking determining unit 14 may determine that a person located on a sidewalk, among the objects recognized in the driving image, has a low possibility of a collision, and may exclude the corresponding object from tracking target.

In addition, when it is determined that a corresponding object is misrecognized based on a position state of the corresponding object according to the type of the recognized object, the tracking determining unit 14 may exclude the corresponding object from the tracking target.

For example, when an object of a large electric billboard or poster is recognized, the tracking determining unit 14 may exclude the corresponding object from the tracking target.

That is, the tracking determining unit 14 may determine a meaningful object, among the objects recognized in the driving image, and determine only the corresponding object as a tracking target.

Through this, the collision avoidance device 10 may use limited resource resources more efficiently.

The object tracking unit 15 may track a movement path, movement speed, and movement direction of an object by tracking a change in the position of the bounding box of the object recognized in the driving image.

Specifically, the object tracking unit 15 may track a change in the position of the bounding box of the recognized object by comparing the previous frame and the current frame of the driving image, and track a movement path and a movement direction of the object based on a change in the position of the bounding box of the object. In this case, the object tracking unit 15 may use various types of object tracking algorithms.

For example, the object tracking unit 15 may track the position of the bounding box of the object using a centroid tracking algorithm. This will be described with reference to FIG. 4.

Figure 4:
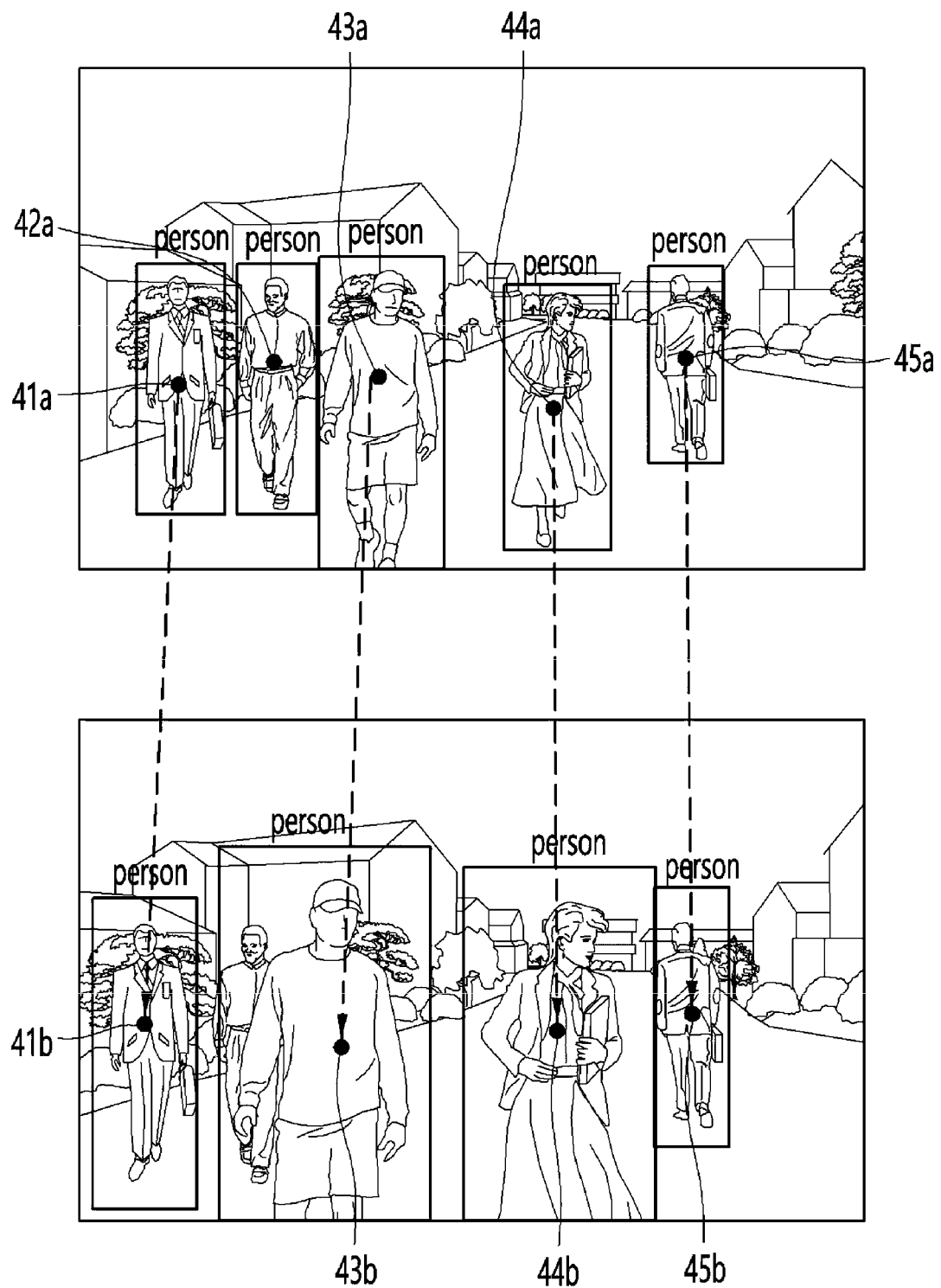

Referring to FIG. 4, the object tracking unit 15 may calculate bounding box center coordinates 41a, 42a, 43a, 44a, and 45a (x, y) of the objects recognized in a previous frame (a) of the driving image and bounding box center coordinates 41b, 43b, 44b, and 45b of the object recognized in the current frame (b) and calculate the Euclidean distance between the center coordinates of the bounding boxes in the previous frame (a) and the current frame (b) to track the corresponding bounding box. At this time, the object tracking unit 15 may track the bounding boxes of the objects assuming that the recognized objects move by the shortest distance, and a tracking ID (or unique ID) for identifying the object may be assigned to the bounding box of each object.

In addition, when an object that was not in the previous frame is recognized in the current frame, the object tracking unit 15 assigns a tracking ID to the new object, and when an object in the previous frame is not recognized in the current frame, a tracking ID of the corresponding object may be deleted.

Also, after tracking the bounding box of the object, the object tracking unit 15 may calculate a movement path and a movement direction of the object based on the amount of change in the position of the center coordinates of the object in the previous frame (a) of the driving image and the current frame (b). In this case, a movement speed and a movement direction of the moving body may be considered.

That is, the object tracking unit 15 may track the tracking target object to track the movement of the object in the driving image, and may determine the movement path, movement speed, and movement direction of the corresponding object.

The normalization processing unit 16 may normalize the driving image including the bound box of the object.

Figure 5A:
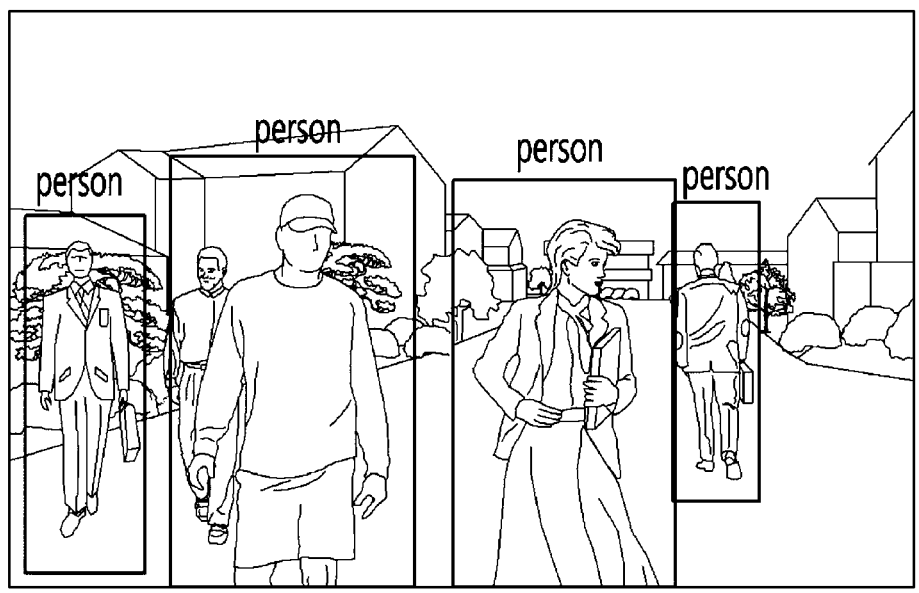
Figure 5B:
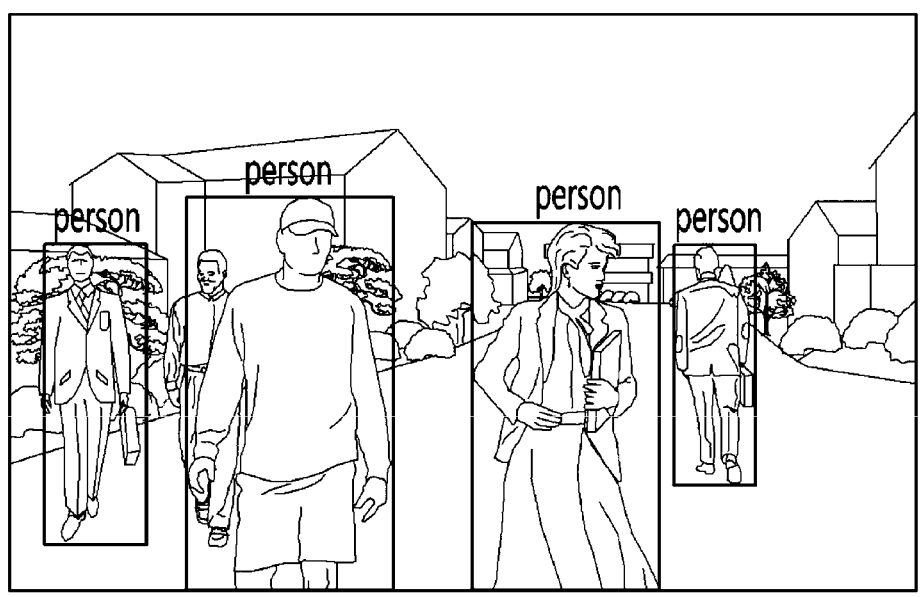

Specifically, the normalization processing unit 16 may normalize the driving image using a low pass filter. For example, the normalization processing unit 16 may normalize a driving image as shown in FIG. 5A into a driving image as shown in FIG. 5B. In this case, the bound box of the object in the driving image may more accurately indicate the position of the object through normalization.

The calculating unit 17 may calculate a relative distance between the moving body and the object based on the recognized object.

First, the calculating unit 17 may generate a virtual horizontal line in the driving image based on the bounding box of the object recognized in the driving image.

Specifically, the calculating unit 17 may calculate a virtual horizontal line in the driving image using Equation 1 below.

$$\overline{y_h} = \frac{1}{N} \cdot \sum_{i=1}^{N}\left(y_{b,i} - H_c \cdot \frac{W_i}{\overline{W} + \Delta W_i}\right) \cong \overline{y_b} = H_c \cdot \frac{\overline{w}}{\overline{W}} \quad \text{[Equation 1]}$$

In Equation 1, $\overline{y_h}$ is a pixel vertical coordinate of the virtual horizontal line, N is the number of bounding boxes recognized in the driving image, $y_{bi}$ is a pixel vertical coordinate of a bottom surface of an i-th recognized bounding box, $H_e$ is an actual height of a camera capturing the driving image, $W_i$ is a pixel width of the i-th recognized bounding box, $\overline{W}$ is an actual average width of the object, $\Delta W_i$ is an actual average width offset of the object, $\overline{y_b}$ is an average pixel vertical coordinate of a bottom surface of the entire bounding box, and $\overline{w}$ is an average width of the recognized object. Here, the average width of the recognized object refers to the average width of the bounding box of the object.

Figure 6:
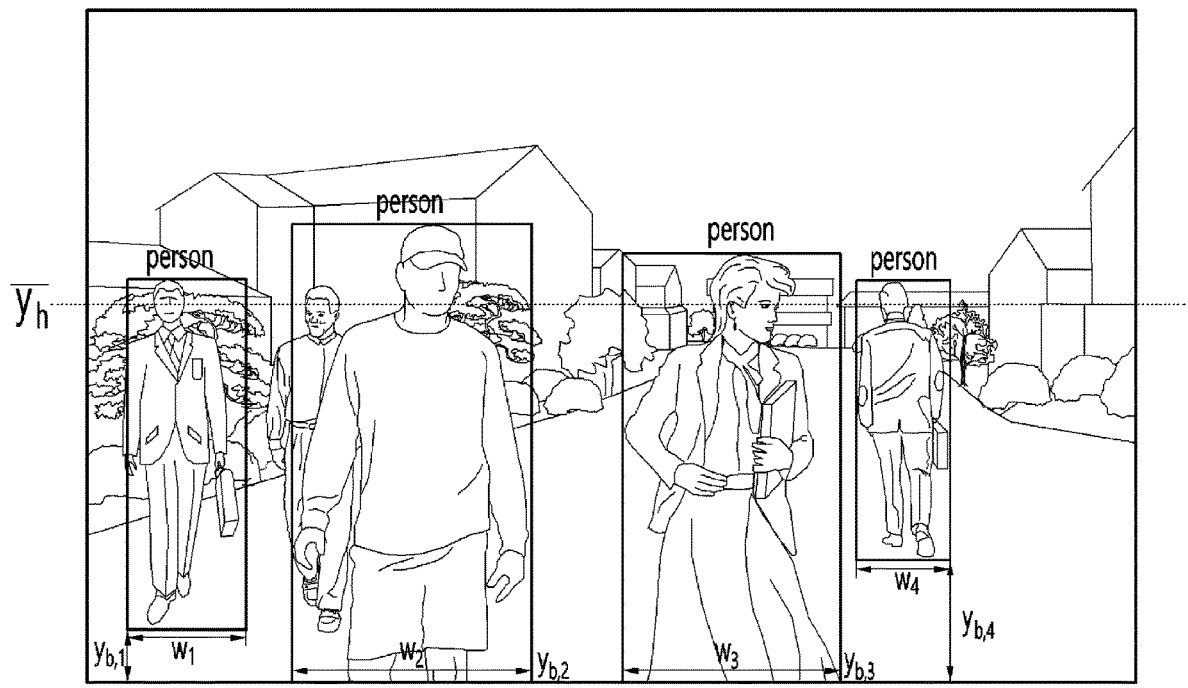

In this regard, referring to FIG. 6, the calculating unit 17 may generate a virtual horizontal line $\overline{y_h}$ in the driving image based on average vertical coordinates of a plurality of bounding boxes in the driving image, an actual height of the camera capturing the driving image, an actual average width of the objects, and an average width of the recognized objects.

In addition, $\overline{w}$ denotes an average of the widths ($w_1$, $w_2$, $w_3$, $w_4$) of the respective bounding boxes of the recognized objects in the driving image, and $\overline{y_b}$ denotes an average of the heights ($y_{b.1}$, $y_{b.2}$, $y_{b.3}$, $y_{b.4}$) of the bottom surfaces of the respective bounding boxes of the recognized objects. In this case, the coordinates may be in units of pixels.

Further, the calculating unit 17 may calculate an estimated relative distance between the corresponding object and the moving body based on the generated virtual horizontal line and the vertical coordinates of the bottom surface of the bounding box.

Specifically, the calculating unit 17 may calculate the estimated relative distance between the object and the moving body using Equation 2 below.

$$D_x = \frac{F_c \cdot H_c}{y_b - \overline{y_h}} \quad \text{[Equation 2]}$$

In Equation 2, $D_x$ may denote the estimated relative distance between the object and the moving body, $F_c$ may denote a focal length of the camera, $H_c$ may denote an actual height of the camera capturing the driving image, $\overline{y_h}$ may denote the virtual horizontal line, and $y_b$ may denote pixel vertical coordinates of the bottom surface of the recognized bounding box. In this regard, an example will be described with reference to FIG. 7A.

Figure 7A:
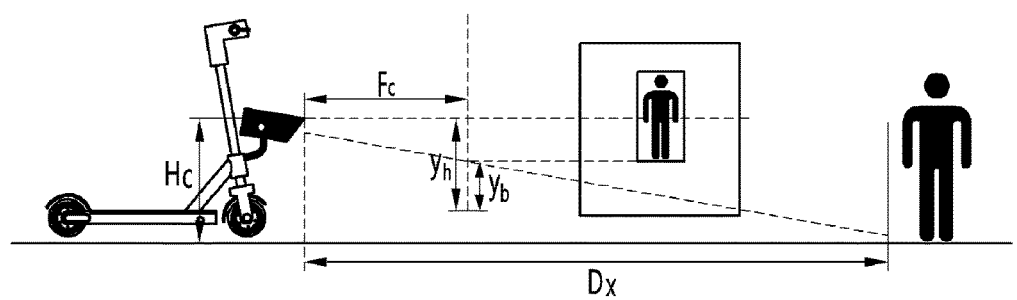
FIGS. 7A and 7B are diagrams illustrating an environment for capturing an image of a personal mobility according to an exemplary embodiment of the present invention.

FIG. 7A is an example of an image capturing environment of a personal mobility, in which reference numeral 71 is an example of a driving image captured in the corresponding image capturing environment.

Referring to FIG. 7A, the calculating unit 17 may calculate the estimated relative distance $D_x$ between a recognized pedestrian and the personal mobility using the height $H_o$ and a focal length $F_c$ of the camera actually installed in the personal mobility, the height $y_b$ of the bottom surface of the bounding box 72 of the pedestrian recognized in the driving image 71, and the vertical coordinate $y_h$ of the calculated virtual horizontal line.

Meanwhile, when the virtual horizontal line cannot be calculated, the calculating unit 17 may calculate the estimated relative distance based on the vertical coordinates of the bounding box of the recognized object and the actual height of the object. Here, a case in which the virtual horizontal line cannot be calculated may include a case in which the actual height of the camera cannot be determined or the pixel vertical coordinates of the bottom surface of the bounding box of the recognized object cannot be determined.

Specifically, the calculating unit 17 may calculate the estimated relative distance between the object and the moving body using Equation 3 below.

$$D_x = F_c \cdot \frac{Y}{y_v} \quad \text{[Equation 3]}$$

In Equation 3, $D_x$ may denote the estimated relative distance between the object and the moving body, $F_c$ may denote a focal length of a camera, $Y$ may denote an actual average height of the object, and $y_v$ may denote a height of the bounding box of the object. In this regard, an example will be described with reference to FIG. 7B.

Figure 7B:
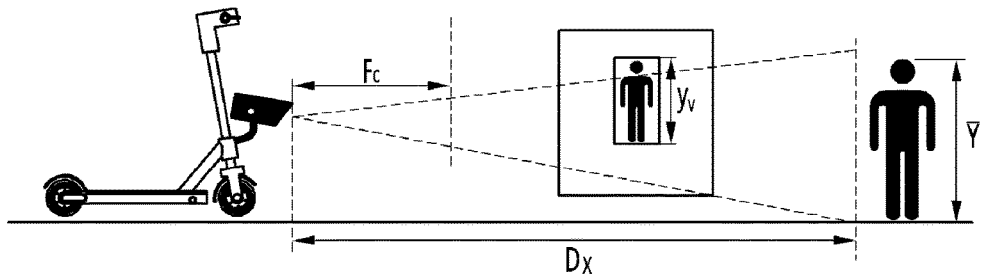

FIG. 7B is an example of an image capturing environment of a personal mobility, and 73 is an example of a driving image captured in the corresponding image capturing environment.

Referring to FIG. 7A, the calculating unit 17 may calculate the estimated relative distance $D_x$ between the recognized pedestrian and the personal mobility using the focal length $F_c$ of the camera mounted on the personal mobility, the height $y_v$ of the bounding box 74 of the pedestrian recognized in the driving image 73, and the actual average height $Y$ of the recognized pedestrian.

Meanwhile, although the personal mobility is described as an example in FIGS. 7A and 7B, the calculation process may be equally applied to other moving bodies such as a vehicle.

Also, the calculating unit 17 may calculate the relative distance by applying the Kalman filter to the calculated estimated relative distance. This will be described with reference to FIG. 8.

Figure 8:
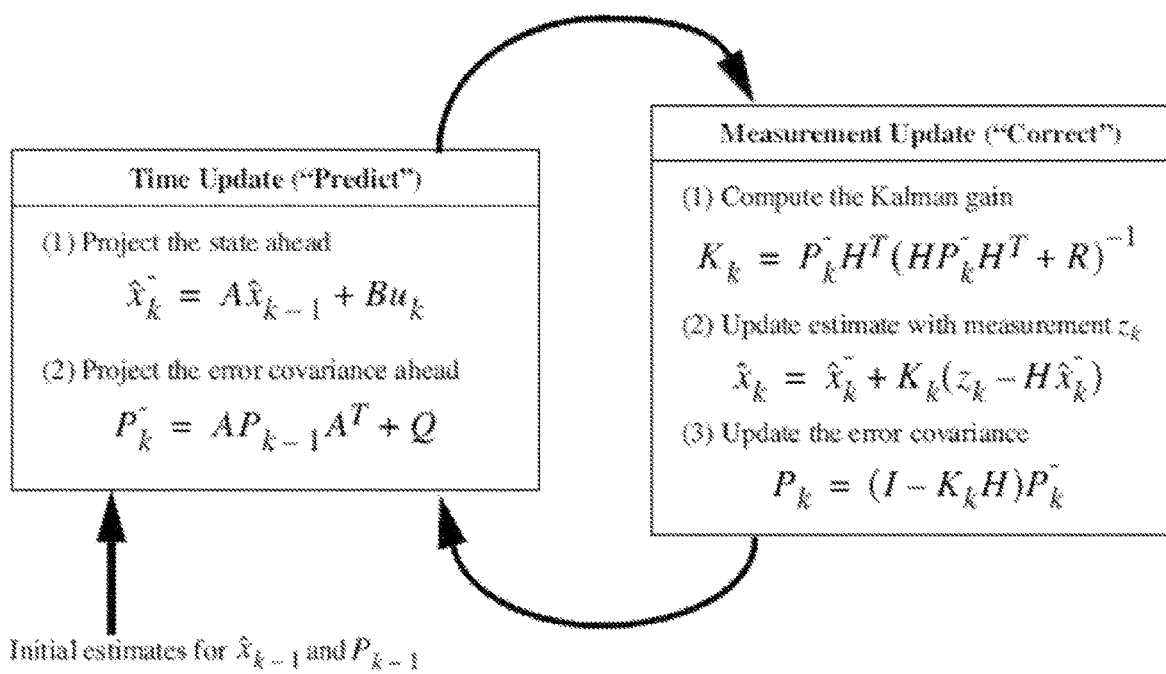
FIG. 8 is a view illustrating a Kalman filter according to an exemplary embodiment of the present invention.

Referring to FIG. 8, the calculating unit 17 may calculate the relative distance $D_x$ through prediction and updating by applying the calculated estimated relative distance $D_x$ to the Kalman filter. Here, the relative distance $D_x$ refers to a value obtained by more accurately calculating the distance between the recognized object and the moving body based on the estimated relative distance $D_x$.

In FIG. 8, a state variable $x_k$ is defined as $[D_x; V_x; A_x]$, in which $D_x$ denotes the estimated relative distance calculated based on X, $v_x$ is the speed of the moving body, and $A_x$ denotes acceleration of the moving body.

In addition, the system model may include a state transition matrix, a measurement value transition matrix, system noise, and measurement value noise, and the system model may be defined as in Equation 4 below.

$$A = \begin{bmatrix} 1 & T & \frac{T^2}{2} \\ 0 & 1 & T \\ 0 & 0 & 1 \end{bmatrix}, H = [1 \ 0 \ 0], Q = \begin{bmatrix} var_{dist} & 0 & 0 \\ 0 & var_{val} & 0 \\ 0 & 0 & var_{acc} \end{bmatrix}, \quad \text{[Equation 4]}$$

$$R = [var_{dist}]$$

A is a state transition matrix, H is a measured value transition matrix, Q is system noise, and R is measured value noise.

That is, the calculating unit 17 may calculate the relative distance $D_x$ by reducing an error of the estimated relative distance $D_x$ using the Kalman filter.

Meanwhile, the relative distance $D_x$ denotes a longitudinal distance, which is a movement direction of the moving body, and this will be described with reference to FIGS. 9A and 9B.

Figure 9A:
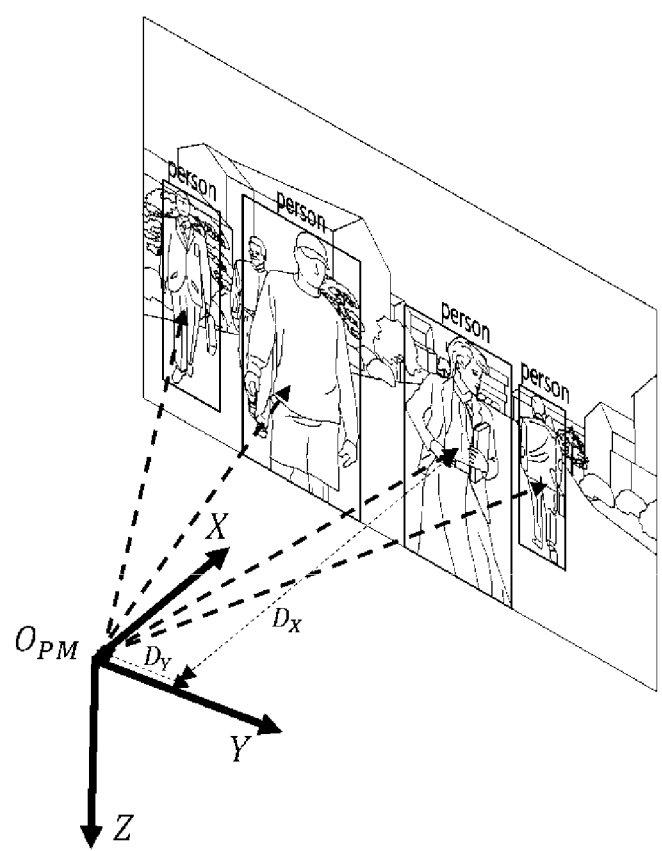
FIGS. 9A and 9B are views illustrating a coordinate system based on a moving body according to an exemplary embodiment of the present invention.
Figure 9B:
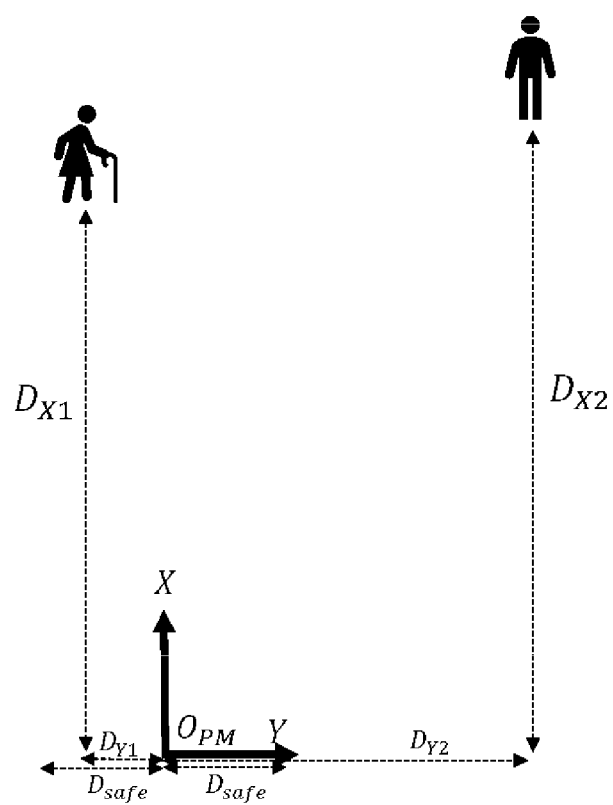

FIGS. 9A and 9B are views illustrating a coordinate system based on a moving body according to an exemplary embodiment of the present invention.

FIG. 9A shows a moving body-based coordinate system as a 3D view, and FIG. 9B shows a moving-object-based coordinate system as a top view. In the coordinate system based on the moving body, a current position of the moving body is a reference point $O_{PM}$, a movement direction (longitudinal direction) of the moving body is the X axis, and a lateral direction of the moving body is the Y axis.

That is, the relative distance $D_x$ may refer to a distance in the X-axis direction between the object and the moving body in the coordinate system based on the moving body.

In addition, the calculating unit 17 may calculate a lateral distance using Equation 5 below.

$$D_Y = \frac{x \cdot D_X}{F_c} \quad \text{[Equation 5]}$$

In Equation 5, $D_Y$ is a distance in the Y-axis direction between the object and the moving body, x is a bounding box pixel horizontal coordinate of the object, $D_x$ is the distance in the X-axis direction between the object and the moving body in the coordinate system based on the moving body, and $F_c$ is the focal length of the camera.

In addition, the calculating unit 17 may determine whether a collision target exists based on the calculated lateral distance $D_Y$.

Specifically, the calculating unit 17 may determine whether or not a collision target exists by comparing the calculated lateral distance and a safety margin distance $D_{safe}$. Here, the safety margin distance is a predetermined distance in the Y-axis direction in the coordinate system based on personal mobility, and may refer to a minimum distance in the Y-axis direction at which the moving body and the object do not collide with each other when the moving body moves in a traveling direction. This will be described with reference to FIG. 9B.

Referring to FIG. 9B, the calculating unit 17 may calculate respective lateral distances $D_{Y1}$ and $D_{Y2}$ of objects 91 and 93, compare the calculated lateral distances $D_{Y1}$ and $D_{Y2}$ with the safety margin distance $D_{Safe}$, determine the object 91 in which the calculated lateral distance is smaller than the safety margin distance, as a collision target of the moving body, and determine the object 93 in which the lateral distance is greater than the safety margin distance as a non-collision target.

In addition, the calculating unit 17 may determine and use the safety margin distance variably based on a type, driving speed, and driving location of the moving body and based on at least one of the user's physical conditions (e.g., height, weight, shoulder width, arm spacing, etc.) when the moving body is a personal mobility.

For example, when a traveling speed of personal mobility is high or when the personal mobility is traveling in a place in which a movement change or a movement speed of an object is high, the calculating unit 17 may determine the safety margin distance to be wider.

In addition, when a collision target is determined, the calculating unit 17 may calculate a required collision time, which is a time required for the moving body to collide with an object recognized based on the calculated relative distance $D_X$ of the corresponding object.

Specifically, the calculating unit 17 may calculate the required collision time between the moving body 200 and the recognized object using Equation 6 below.

$$T = \frac{D_X}{V} \quad \text{[Equation 6]}$$

In Equation 6, T is the required collision time, D is a relative distance between the moving body 200 and the recognized object, and V is a speed of the moving body.

That is, the calculating unit 17 may calculate the required collision time with the recognized object in consideration of the speed of the moving body.

Meanwhile, the calculating unit 17 may determine a relative distance calculation method according to a calculation condition, and calculate a relative distance using the determined relative distance calculation method. Here, the relative distance calculation method is a method using the virtual horizontal line (Equation 2) described above and a method using the bounding box size (Equation 3), and the calculation conditions may include at least one of whether a virtual horizontal line can be calculated, a size of the recognized object (a size of the bounding box), a change degree of inclination during traveling), and the number of recognized objects.

For example, in the case of calculation conditions in which the change in inclination during traveling exceeds a certain reference and the recognized object is one, the calculating unit 17 may calculate a relative distance in a manner of using a bounding box size.

That is, the calculating unit 17 may determine the relative distance calculation method according to the calculation conditions, calculate a relative distance between the moving body and the object based on the recognized object by the determined calculation method, and calculate the required collision time between the object and the moving body based on the calculated relative distance.

The controller 18 may determine a possibility of colliding with an object and may provide various control commands for preventing the moving body from colliding.

Specifically, the controller 18 may determine the possibility of collision with the recognized object based on the calculated required collision time. In this case, the controller 18 may determine the possibility of a collision in consideration of a collision factor. Here, the collision factor may include various factors affecting the possibility of a collision, such as brake performance of the moving body, a driving environment of the moving body (paved road, sidewalk, unpaved road driving, etc.), a weight of the user using the moving body, and a surrounding environment (an area with many pedestrians, an area requiring deceleration, etc.).

Also, when it is determined that there is a possibility of a collision, the controller 18 may provide a collision warning guidance or control the moving body to be braked.

For example, when it is determined that there is a possibility of a collision with the object based on the calculated required collision time, the controller 18 may generate a control command for controlling an operation of the personal mobility and provide the generated control command to the personal mobility.

Next, a collision prevention method of the collision avoidance device 10 is described with reference to FIG. 10.

Figure 10:
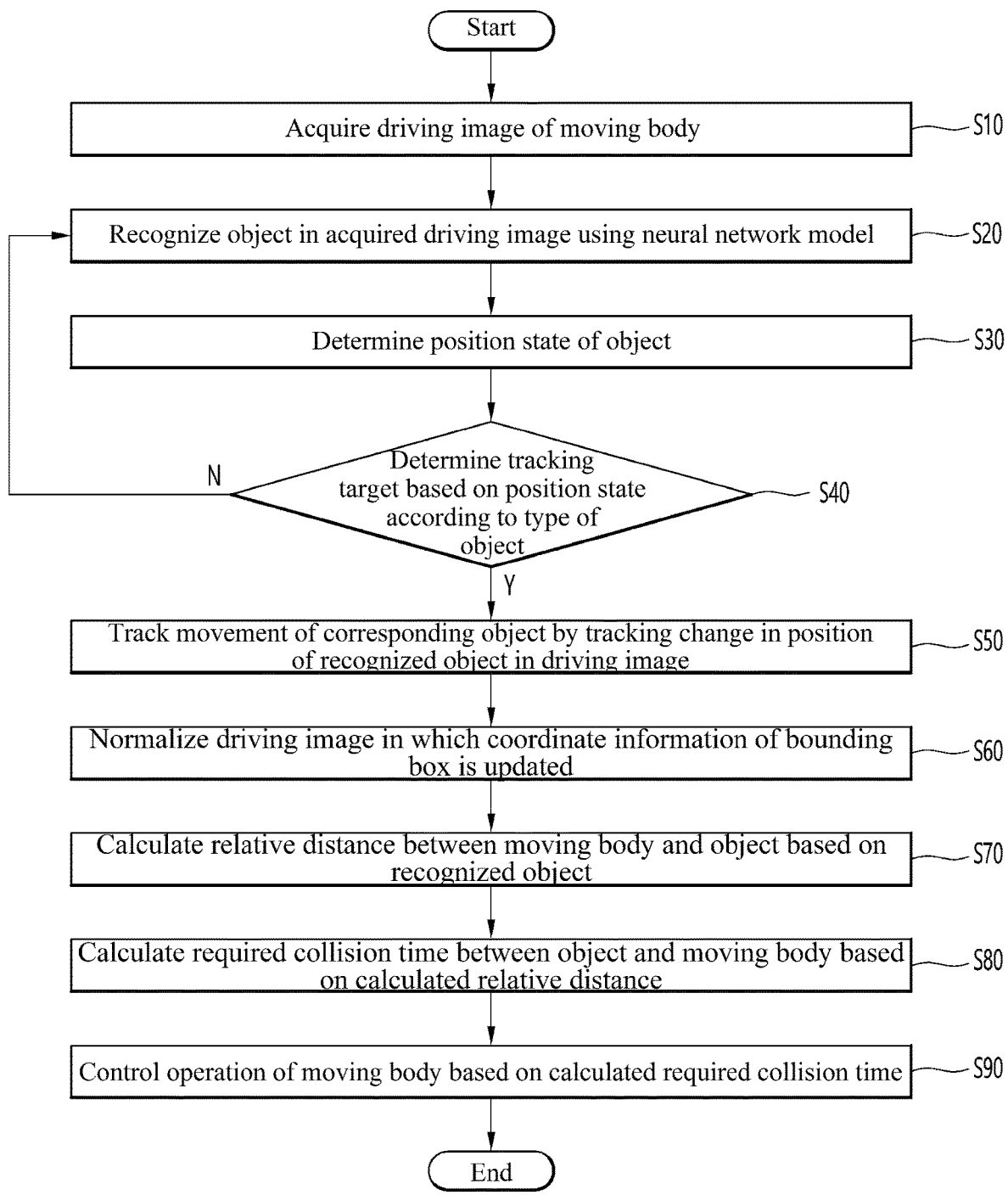
FIG. 10 is a flowchart illustrating a collision avoidance method according to an exemplary embodiment of the present invention.

FIG. 10 is a flowchart illustrating a collision avoidance method according to an exemplary embodiment of the present invention.

Referring to FIG. 10, a driving image of the moving body 200 captured by an internal camera of the moving body 200 or an external camera device may be acquired (S10).

Also, the collision avoidance device 10 may recognize an object in the driving image acquired using the neural network model (S20). Here, the neural network model may recognize an object in the driving image, and outputs a bounding box indicating an object region in the driving image and a classification result of the object in the bounding box.

Specifically, in the step of recognizing the object (S20), the acquired driving image may be input to the neural network model in units of frames and a driving image including a bounding box indicating an object region in the driving image and type information of an object in the bounding box may be acquired, thereby recognizing an object in the driving image.

Then, a position state of the object recognized in the driving image may be determined (S30).

Specifically, in the step of determining the position state (S30), a position state of the corresponding object may be determined based on the bounding box positions of the recognized objects in the driving image.

A tracking target may be determined based on the position state according to the type of object (S40).

Specifically, in the step of determining a tracking target (S40), a tracking target may be determined by determining whether the recognized object is misrecognized based on the position state of the corresponding object according to the type of the recognized object or by determining a possibility of colliding with a moving body.

For example, in the step of determining a tracking target S40, a possibility of collision with a moving body may be determined based on the position state of the corresponding object according to the type of the recognized object, an object having a low possibility of collision with a moving body may be excluded from a tracking target (S40: N), and the object recognizing step (S20) may be performed again.

In addition, in the step of determining a tracking target (S40), an object having a high possibility of colliding with a moving body may be determined as a tracking target (S40: Y).

In addition, a movement of the object may be tracked by tracking a change in the position of the object in the driving image determined as the tracking target (S50).

Specifically, the collision avoidance device 10 may track a change in the position of the bounding box of the recognized object by comparing the current frame with a previous frame of the driving image, and track a movement path and movement direction of the object based on the change in the position of the bounding box of the object.

Then, the driving image including the recognized object may be normalized (S60).

Also, a relative distance between the moving body and the object may be calculated based on the recognized object (S70).

Specifically, in the step of calculating a relative distance (S70), a virtual horizontal line in the driving image may be generated based on the bounding boxes of the recognized objects, and an estimated relative distance may be calculated based on the generated virtual horizontal line and vertical coordinates of a bottom surface of a bounding box of a recognized object.

In addition, when the virtual horizontal line cannot be generated, in the step of calculating the relative distance (S70), the estimated relative distance may be calculated based on a vertical height of the bounding box of the recognized object and an actual height of the object.

In the step of calculating the relative distance (S70), the relative distance may be calculated through prediction and updating by applying the calculated estimated relative distance to the Kalman filter.

Then, a lateral distance may be calculated, whether there is a collision target may be determined based on the calculated lateral distance, and if there is a collision target, a required collision time between the object and the moving body may be calculated based on the calculated relative distance of the corresponding collision target object (S80). Specifically, in calculating the required collision time (S80), the required collision time may be calculated in consideration of a speed of the moving body.

Then, an operation of the moving body may be controlled based on the calculated required collision time (S90). Specifically, in the controlling step (S90), if there is a possibility of colliding with an object, a collision warning guidance may be provided or the moving body may be controlled to be braked.

Meanwhile, the collision avoidance device 10 described above may be implemented using software, hardware, or a combination thereof. For example, according to the hardware implementation, the collision avoidance device 10 may be implemented using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, micro-processors, and electrical units for performing other functions.

Figure 11:
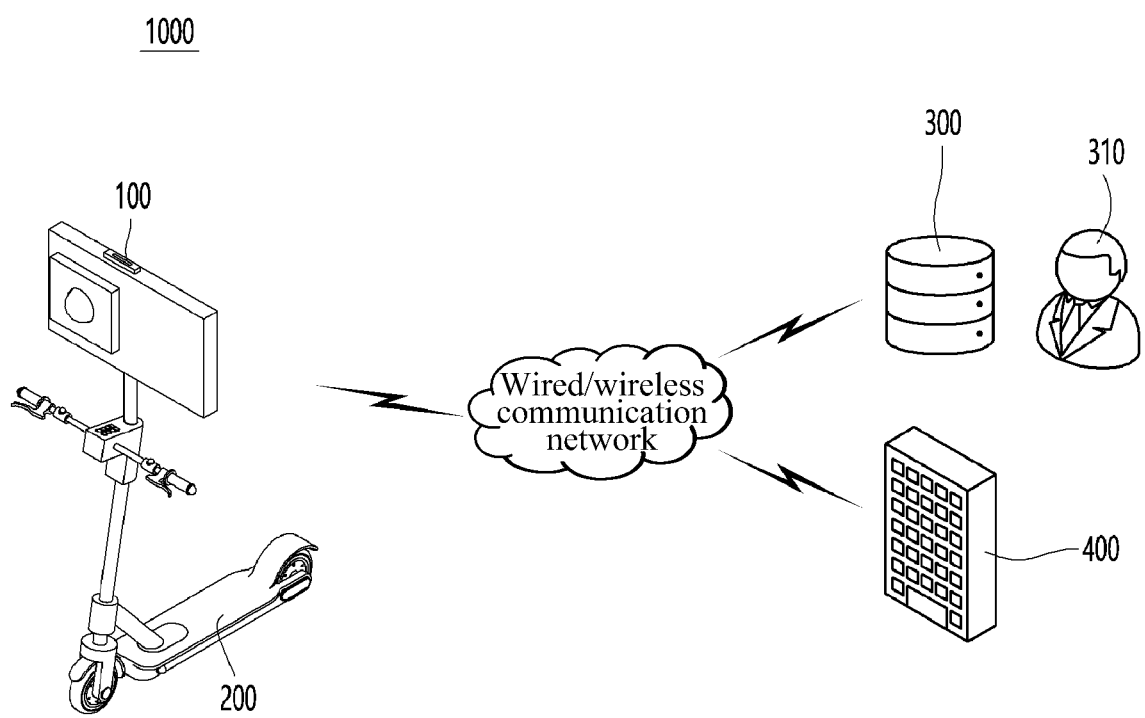
FIG. 11 is a view illustrating a moving body management system according to an exemplary embodiment of the present invention.

FIG. 11 is a view illustrating a moving body management system 1000 according to an exemplary embodiment of the present invention.

Referring to FIG. 11, the moving body management system 1000 may include an electronic device 100, a moving body 200, a monitoring server 300, and a related organization 400.

The electronic device 100 may include a function of the collision avoidance device 10 described above as one component and may be implemented as various devices such as a smartphone, a tablet computer, a notebook computer, a personal digital assistant (PDA), a portable multimedia player (PMP), smart glasses, project glasses, a navigation device, a black box, a dash cam, or a video recorder, etc. capable of providing driving-related guidance to a user of a moving body, and the electronic device 100 may be provided in the moving body 200.

The moving body 200 may include both a non-shared moving body used by one user and a shared moving body used by a plurality of users. Hereinafter, the shared moving body will be described. Here, the shared moving body may be rented and returned and a rental fee may be paid through a user application installed in a user terminal.

The monitoring server 300 may continuously monitor the moving body 200.

Specifically, the monitoring server 300 may monitor the rental, return, and rental fee payment of the corresponding moving body 200 through the user application, and may transmit user information to the electronic device 100. Here, the user information may include information on the user who has rented the moving body 200 and may include whether or not to pay the rental fee for the moving body 200 and face information of the user.

In addition, the monitoring server 300 may receive event information from the electronic device 100, and a manager 310 may transmit a manager command for controlling the operation of the moving body 200 to the corresponding moving body 200 or the electronic device 100 based on the event information, or may contact the related organization.

That is, the monitoring server 300 may respond to an event situation occurring to the user based on the event information.

The related organization 400 is an organization related to the event situation, and may be a police station, a medical institution, a rescue organization, etc. according to the type of the event.

Hereinafter, the electronic device 100 which is a component of the moving body management system 1000 will be described.

Figure 12:
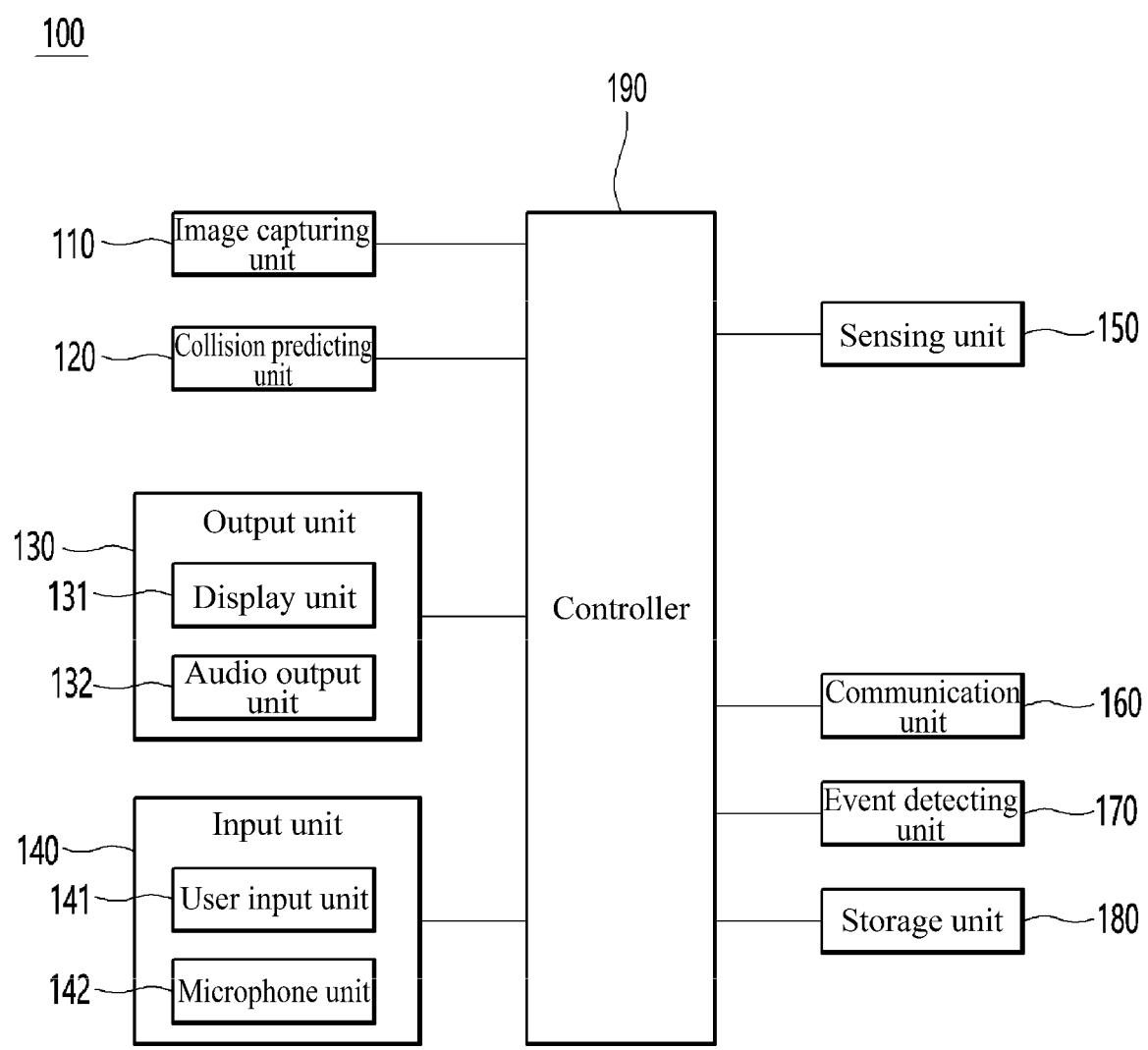
FIG. 12 is a block diagram illustrating an electronic device according to an exemplary embodiment of the present invention.

FIG. 12 is a block diagram illustrating an electronic device according to an exemplary embodiment of the present invention.

Referring to FIG. 12, the electronic device 100 may include an image capturing unit 110, a collision predicting unit 120, an output unit 130, an input unit 140, a sensing unit 150, a communication unit 160, an event detecting unit 170, a storage unit 180, and a controller 190.

The image capturing unit 110 may perform a function of capturing an image of a periphery of the moving body.

Specifically, the image capturing unit 110 may obtain a driving image or a parking image of the moving body by capturing an image of the front. Also, the image capturing unit 110 may capture an image of a user of the moving body to obtain a user image.

The collision predicting unit 120 may perform the functions of the collision avoidance device 10 described above.

Specifically, the collision predicting unit 120 may perform a function of each of the image acquiring unit 11, the object recognizing unit 12, the position state determining unit 13, the tracking determining unit 14, the object updating unit 15, the normalization processing unit 16, and the calculating unit 17.

That is, the collision predicting unit 120 may acquire a driving image captured by the image capturing unit 110 to recognize an object, calculate a relative distance to the recognized object, and calculate a required collision time based on the calculated relative distance.

The output unit 130 is a device for outputting various data of the electronic device 100 to a user as images and/or audio.

For example, the output unit 130 may output information for guiding driving of the moving body 200 based on the required collision time. Here, the output unit 130 may include all or part of the display unit 131 and the audio output unit 132.

The display unit 131 is a device for outputting data that may be visually recognized by the user.

Specifically, the display unit 131 may output driving guidance information, a driving speed, a driving image, a riding time (i.e., get-on time), a payment time, a remaining rental time, and the like.

For example, when it is determined that there is a possibility of a collision, guide information warning of a collision may be output on the display unit 131.

The audio output unit 132 is a device for outputting data that may be recognized audibly. Here, the audio output unit 132 may be implemented as a speaker expressing a sound of data to be notified to the user of the electronic device 100.

Specifically, the audio output unit 132 may output driving guidance information, a driving speed, a driving image, a remaining rental time, and the like.

The input unit 140 functions to convert a physical input from the outside of the electronic device 100 into a specific electrical signal. Here, the input unit 140 may include all or part of a user input unit 141 and a microphone unit 142.

The user input unit 141 may receive a user input such as a touch or a push operation. Here, the user input unit 141 may be implemented using at least one of various button shapes, a touch sensor for receiving a touch input, and a proximity sensor for receiving an approaching motion.

The microphone unit 142 may receive a user's voice and a sound generated inside or outside a vehicle.

The sensing unit 150 may sense and acquire various data required for the operation of the electronic device 100.

Specifically, the sensing unit 150 may sense an impact of the electronic device 100 or the moving body to acquire impact data. Also, the sensing unit 150 may acquire current location data of the electronic device 100 or the moving body.

The communication unit 160 may transmit/receive various data by communicating with the moving body 200, the monitoring server 300, an external device, and the related organization 400. Here, the external device may refer to another electronic device or another moving body 200.

Specifically, the communication unit 160 may transmit a control command for controlling an operation of the moving body to the moving body.

In addition, the communication unit 160 may transmit or receive user information or event information to or from the monitoring server 300. Also, the communication unit 160 may receive a manager command from the monitoring server 300.

The event detecting unit 170 may detect whether various events of the moving body occur.

Specifically, the event detecting unit 170 may detect whether a riding event occurs based on a user image. Here, the riding event is information indicating whether the user of the shared moving body wears safety equipment when riding the shared moving body, whether or not to make a prepayment, and whether the user is himself or herself.

For example, the event detecting unit 170 recognizes whether the user is wearing safety equipment (helmet, knee protector, elbow protector, etc.) through image processing of the user image, and when the user is not wearing the safety equipment, the event detecting unit 170 may detect that a riding event has occurred.

As another example, the event detecting unit 170 recognizes a face of the user who rides through image processing of the user image and compares the user's face with the registered user's face information of the corresponding shared moving body. If it is determined that the face of the user who rides is different from the registered user's face information, the event detecting unit 170 may detect that a riding event has occurred.

Also, the event detecting unit 170 may detect whether an accident event occurs based on at least one of a driving image, a user input, and impact data. Here, the accident event relates to whether an emergency situation occurs for the user of the shared moving body, and is event information indicating whether the user of the shared moving body is in a collision accident while driving or whether or not a slip accident occurs. Here, the user input may include a user's emergency rescue request command.

For example, in the case of colliding with an object recognized in the driving image, the event detecting unit 170 may detect that an accident event has occurred to the user of the shared moving body.

Also, the event detecting unit 170 may detect whether an attention event occurs based on at least one of a driving image and current location data. Here, the attention event relates to whether or not a situation requiring attention to the user of the shared moving body occurs, and is event information indicating speeding or abnormal driving (illegal overtaking, illegal intervening, etc.).

For example, when it is determined that the moving body travels adjacent to an object recognized in the driving image, the event detecting unit 170 may detect that an attention event has occurred to the user of the shared moving body.

As another example, when it is determined a speed of the current shared moving body is faster than a prescribed speed of a corresponding area based on the current location data, the event detecting unit 170 may detect that an attention event has occurred to the user of the shared moving body.

Also, the event detecting unit 170 may detect whether an alighting event occurs based on at least one of a user image and current location data. Here, the alighting event is event information indicating whether the user of the shared moving body takes off and stores the safety equipment when the user of the shared moving body is getting off, and whether the shared moving body is illegally parked.

For example, when the shared moving body is parked in an illegal parking area based on the current location data, the event detecting unit 170 may determine that an alighting event has occurred.

That is, the event detecting unit 170 may detect whether at least one of a riding event, an accident event, an attention event, and an alighting event of the user of the shared moving body occurs based on the driving image, the user image, the impact data, and the current location data.

The storage unit 180 may perform a function of storing various data necessary for the operation of the electronic device 100.

Also, the storage unit 180 may store data generated by the operation of the electronic device 100, for example, a driving image, a recognized object, event information, a driving route, and the like.

The storage unit 180 may be implemented as an internal storage element such as a random access memory (RAM), a flash memory, read only memory (ROM), an erasable programmable ROM (EPROM), an electronically erasable and programmable ROM (EEPROM), a register, a hard disk, a removable disk, a memory card, a universal subscriber identity module (USIM), and a detachable storage element such as a USB memory or the like.

The controller 190 may control an overall operation of the electronic device 100.

Specifically, when the event detecting unit 190 detects an occurrence of an event, the controller 170 may generate event information and control the communication unit 160 to transmit the generated event information to the monitoring server 300 or the related organization 400.

Here, the event information may include generated event type information (riding event, accident event, attention event, alighting event, etc.), event image information (e.g., driving image before and after an event, user image, etc.), event occurrence location and time Information, a movement path of an object in the driving image, a movement speed, and a movement direction, etc.

In addition, the controller 190 may determine urgency for each generated event information and control the communication unit 160 to selectively transmit the event information generated according to the urgency to the monitoring server 300 or the related organization 400. In this case, the controller 190 may determine the urgency according to the degree of damage of the user according to the occurrence of the event, and may determine the urgency based on at least one of event type information, impact data, and the speed of the moving body 200.

Also, the controller 190 may control the operation of the electronic device 100 or the moving body 200 based on a manager command. Here, the manager command may include a control command for controlling an emergency light of the moving body to operate, for controlling the rescue siren to operate, or for controlling the moving body to be braked.

Through this, it is possible to prevent an accident occurring in the moving body 200 from escalating and to minimize damage to the user of the moving body 200.

Meanwhile, the controller 190 may perform all functions of the controller 18 of the collision avoidance device 10 described above.

Hereinafter, a moving body monitoring method of the moving body management system 1000 will be described with reference to FIG. 13.

Figure 13:
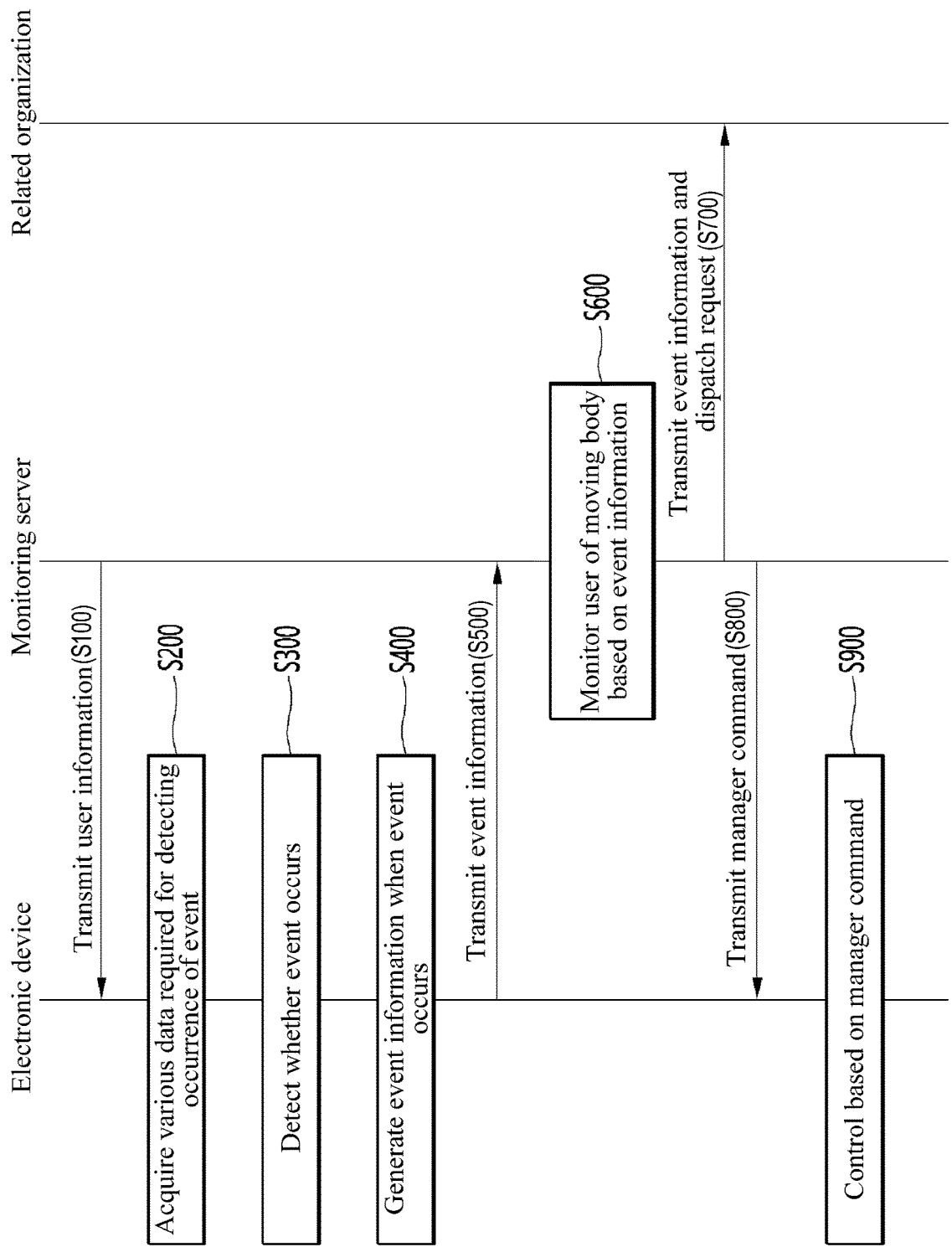
FIG. 13 is a timing diagram illustrating a method for monitoring a moving body according to an exemplary embodiment of the present invention.

FIG. 13 is a timing diagram illustrating a moving body monitoring method of a moving body management system according to an exemplary embodiment of the present invention.

Referring to FIG. 13, the monitoring server 300 may transmit user information to the electronic device 100 (S100). Here, the user information may be input through a user application.

Next, the electronic device 100 may acquire various data necessary to detect an occurrence of an event (S200). Specifically, the electronic device 100 may acquire a front image, a surrounding image, a user image, impact data, and current location data of the moving body 200.

Next, the electronic device 100 may detect whether an event has occurred to the user of the moving body 200 based on the acquired data (S300).

Specifically, the electronic device 100 may detect whether a riding event, an accident event, an attention event, or an alighting event occurs to the user of the shared moving body based on the driving image, the user image, the impact data, and the current location data.

In addition, when an event occurs, the electronic device 100 may generate event information (S400) and transmit the generated event information to the monitoring server 300 or to the related organization 400 according to the urgency of the generated event (S500).

Next, the monitoring server 300 may monitor the corresponding moving body 200 or the user of the moving body in real time based on the received event information (S600).

In addition, the monitoring server 300 may transmit event information and a dispatch request command to the related organization 400 according to determination of the manager 310 (S700). In this case, the related organization 400 may be dispatched to a place where the corresponding event occurred based on the event information.

Also, the monitoring server 300 may transmit a manager command corresponding to the generated event to the electronic device 100 (S800). For example, the monitoring server 300 may transmit a manager command for controlling the moving body to be braked to the electronic device 100.

Then, the electronic device 100 may control the operation of the electronic device 100 or the moving body 200 based on the received manager command (S900).

Through the moving body management system 1000 described above, the user of the moving body may be monitored in real time, and an event situation of the user of the moving body may be quickly dealt with.

In addition, the monitoring server 300 may identify a cause of loss, damage, accident, etc. of the moving body through the event information.

Furthermore, in an exemplary embodiment of the present invention, through the moving body management system 1000, a government policy may be revitalized by inducing a user's insurance discount through consultation with an insurance company of the moving body, while at the same time leading the market through mandatory recording and collision prevention of the moving body.

Meanwhile, at least one of the modules constituting the collision avoidance device 10 and the electronic device 100 of a moving body according to the present invention may be implemented as a module of a system for autonomous driving to perform a route guidance function. This will be described in more detail with reference to FIGS. 14 and 15.

Figure 14:
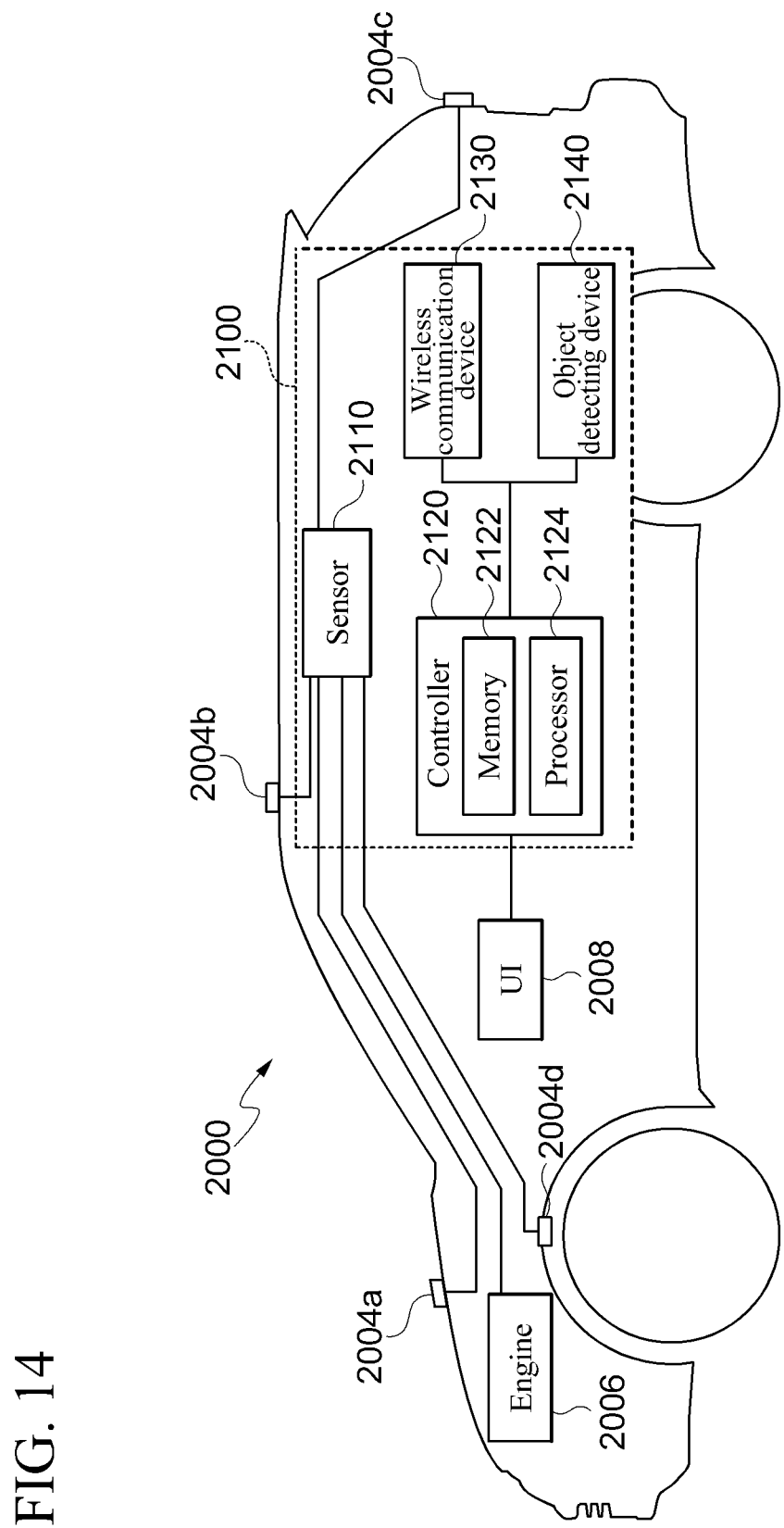
FIG. 14 is a block diagram illustrating an autonomous driving system according to an exemplary embodiment of the present invention.

Referring to FIG. 14, an autonomous vehicle 2000 according to the present exemplary embodiment includes a control device 2100, sensing modules 2004*a*, 2004*b*, 2004*c*, and 2004*d*, an engine 2006, and a user interface 2008.

The autonomous vehicle 2000 may have an autonomous driving mode or a manual mode. For example, the autonomous vehicle 2000 may be switched from the manual mode to the autonomous driving mode or from the autonomous driving mode to the manual mode according to a user input received through the user interface 2008.

When the vehicle 2000 is operated in the autonomous driving mode, the autonomous vehicle 2000 may be operated under the control of the control device 2100.

In this exemplary embodiment, the control device 2100 may include a controller 2120 including a memory 2122 and a processor 2124, a sensor 2110, a communication device 2130, and an object detecting device 2140.

Here, the object detecting device 2140 may perform all or some of the functions of the collision avoidance device 10 described above.

In this exemplary embodiment, the object detecting device 2140 is a device for detecting an object located outside the vehicle 2000, and the object detecting device 2140 may detect an object located outside the vehicle 2000 and generate object information according to a detection result.

The object information may include information on the presence or absence of an object, location information of the object, distance information between the vehicle and the object, and relative speed information between the vehicle and the object.

The object may include various objects located outside the vehicle 2000 such as lane markings, other vehicles, pedestrians, traffic signals, light, roads, structures, speed bumps, terrain objects, animals, and the like. Here, the traffic signal may be a concept including a traffic light, a traffic sign, or a pattern or text drawn on a road surface. In addition, light may be light generated from a lamp provided in another vehicle, light generated from a street lamp, or sunlight.

The structure may be an object located around a road and fixed to the ground. For example, the structure may include street lights, street trees, buildings, power poles, traffic lights, and bridges. The terrain objects may include mountains, hills, and the like.

The object detecting device 2140 may include a camera module. The controller 2120 may extract object information from an external image captured by the camera module and cause the controller 2120 to process the information.

In addition, the object detecting device 2140 may further include imaging devices for recognizing an external environment. In addition to LIDAR, RADAR, GPS device, odometry, and other computer vision devices, ultrasonic sensors, and infrared sensors may be used, and these devices may be selectively or simultaneously operated as necessary to enable more precise detection.

Meanwhile, the collision avoidance device 10 according to an exemplary embodiment of the present invention may determine a position state of a recognized object, and determine a tracking target based on the position state according to a type of an object. Also, the collision avoidance device 10 may track a change in a position of the object in the driving image determined as a tracking target to track a movement of the object, normalize the driving image including the recognized object, and calculate a relative distance between the moving body and the object based on the recognized object.

Also, the collision avoidance device 10 may control an operation of the moving body based on a calculated required collision time in connection with the control device 2100 of the autonomous vehicle 2000.

For example, when there is a possibility of a collision between the autonomous vehicle 2000 and an object, the autonomous vehicle 2000 may control a brake to lower a speed or stop. As another example, when the object is a moving body, the autonomous vehicle 2000 may control a driving speed of the autonomous vehicle 2000 to move at the same speed as the object.

The collision avoidance device 10 according to an exemplary embodiment of the present invention may be configured as one module in the control device 2100 of the autonomous vehicle 2000. That is, the memory 2122 and the processor 2124 of the control device 2100 may implement a collision avoidance method according to the present invention in software.

In addition, the sensor 2110 may be connected to the sensing modules 2004a, 2004b, 2004c, and 2004d to acquire various kinds of sensing information on a vehicle internal/external environment. Here, the sensor 2110 may include a posture sensor (e.g., a yaw sensor, a roll sensor, or a pitch sensor), a collision sensor, a wheel sensor, a speed sensor, an inclination sensor, a weight detection sensor, a heading sensor, a gyro sensor, a position module, a vehicle forward/reverse sensor, a battery sensor, a fuel sensor, a tire sensor, a steering sensor based on handle rotation, a vehicle internal temperature sensor, a vehicle internal humidity sensor, an ultrasonic sensor, an illuminance sensor, an accelerator pedal position sensor, a brake pedal position sensor, and the like.

Accordingly, the sensor 2110 may acquire vehicle posture information, vehicle collision information, vehicle direction information, vehicle position information (GPS information), vehicle angle information, vehicle speed information, vehicle acceleration information, vehicle inclination information, vehicle advance/reverse information, battery information, fuel information, tire information, vehicle lamp information, vehicle internal temperature information, vehicle internal humidity information, steering wheel rotation angle, vehicle external illumination, and a sensing signal for pressure applied to an accelerator pedal, pressure applied to a brake pedal, etc.

In addition, the sensor 2110 may further include an accelerator pedal sensor, a pressure sensor, an engine speed sensor, air flow sensor (AFS), an intake air temperature sensor (ATS), water temperature sensor (WTS), a throttle position sensor (TPS), a TDC sensor, a crank angle sensor (CAS), and the like.

In this manner, the sensor 2110 may generate vehicle state information based on sensing data.

The wireless communication device 2130 is configured to implement wireless communication between the autonomous vehicles 2000. For example, the autonomous vehicle 2000 may communicate with a user's mobile phone, another wireless communication device 2130, another vehicle, a central device (a traffic control device), a server, and the like. The wireless communication device 2130 may transmit and receive wireless signals according to wireless communication protocols. The wireless communication protocols may be Wi-Fi, Bluetooth, long-term evolution (LTE), code division multiple access (CDMA), wideband code division multiple access (WCDMA), global systems for mobile communications (GSM), but are not limited thereto.

In addition, in the present exemplary embodiment, the autonomous vehicle 2000 may implement vehicle-to-vehicle communication through the wireless communication device 2130. That is, the wireless communication device 2130 may communicate with another vehicle and other vehicles on the road through vehicle-to-vehicle communication (V2V). The autonomous vehicle 2000 may transmit and receive information such as driving warning and traffic information through V2V communication and may request information or receive a request from another vehicle. For example, the wireless communication device 2130 may perform V2V communication with a dedicated short-range communication (DSRC) device or a cellular-V2V (C-V2V) device. In addition, in addition to V2V communication, communication between the vehicle and other objects (vehicle to everything communication (V2X)) (e.g., electronic devices carried by pedestrians) may be implemented through the wireless communication device 2130.

In this exemplary embodiment, the controller 2120 is a unit that controls an overall operation of each unit in the vehicle 2000 and may be configured at the time of manufacturing by a manufacturer of the vehicle or additionally configured to perform a function of autonomous driving after manufacturing. Alternatively, a component for continuously performing an additional function may be included through upgrading of the controller 2120 configured at the time of manufacturing. The controller 2120 may also be referred to as an electronic controller (ECU).

The controller 2120 may collect various data from the connected sensor 2110, the object detecting device 2140, the communication device 2130, etc. And transfer a control signal to other components in the vehicle such as the sensor 2110, the engine 2006, the user interface 2008, the communication device 2130, and the object detecting device 2140, based on the collected data. In addition, although not shown, the control signal may also be transmitted to an acceleration device, a braking system, a steering device, or a navigation device related to driving of the vehicle.

In this exemplary embodiment, the controller 2120 may control the engine 2006. For example, the controller 2120 may detect a speed limit of a road on which the autonomous vehicle 2000 is running and control the engine 2006 so that a driving speed of the vehicle does not exceed the speed limit or control the engine 2006 to accelerate a driving speed of the autonomous vehicle 2000 within a range not exceeding the speed limit.

In addition, if the autonomous vehicle 2000 approaches or leaves a lane marking during driving, the controller 2120 may determine whether such lane marking proximity and or departure is according to a normal driving situation or whether it is according to other driving conditions, and control the engine 2006 to control driving of the vehicle according to a determination result. Specifically, the autonomous vehicle 2000 may detect lane markings formed on both sides of a lane in which the vehicle is running. In this case, the controller 2120 may determine whether the autonomous vehicle 2000 is approaching or leaving the lane marking, and if it is determined that the autonomous vehicle 2000 is approaching or leaving the lane marking, the controller 2120 may determine whether such driving is based on an accurate driving situation or other driving situations. Here, an example of a normal driving situation may be a situation in which the vehicle needs to change lanes. In addition, an example of other driving situations may be a situation in which the vehicle does not need to change lanes. If it is determined that the autonomous vehicle 2000 is approaching or leaving the lane marking in a situation in which the vehicle does not need to change lanes, the controller 2120 may control the autonomous vehicle 2000 to normally run without departing the lane marking.

When another vehicle or an obstacle is present in front of the vehicle, the controller 2120 may control the engine 2006 or a braking system to decelerate the driving vehicle, and may control a trace, a driving route, and a steering angle, in addition to the speed. Alternatively, the controller 2120 may control the driving of the vehicle by generating a necessary control signal according to recognition information of other external environments such as a lane of the driving vehicle and a driving signal.

In addition to generating a control signal of its own, the controller 2120 may perform communication with a nearby vehicle or a central server and transmit a command to control peripheral devices through received information, thereby controlling the driving of the vehicle.

In addition, it may be difficult to accurately recognize a vehicle or a lane marking if a position of the camera module is changed or an angle of view is changed. In order to prevent this, the controller 2120 may generate a control signal to perform calibration of the camera module. Accordingly, in this exemplary embodiment, since the controller 2120 generates a calibration control signal to the camera module, even if a mounting position of the camera module is changed due to vibration or impact that occurs due to movement of the autonomous vehicle 2000, a normal mounting position, direction, and angle of view of the camera module may be continuously maintained. If an initial mounting position, direction, and angle of view information of the camera module stored in advance and an initial mounting position, direction, and angle of view information of the camera module measured during the driving of the autonomous vehicle 2000 are changed by a threshold value or more, the controller 2120 may generate a control signal to calibrate the camera module.

In this exemplary embodiment, the controller 2120 may include the memory 2122 and the processor 2124. The processor 2124 may execute software stored in the memory 2122 according to a control signal from the controller 2120. Specifically, the controller 2120 may store data and instructions for performing the lane marking detecting method according to the present invention in the memory 2122, and the instructions may be executed by the processor 2124 to implement one or more methods disclosed herein.

In this case, the memory 2122 may be stored in a recording medium executable by the nonvolatile processor 2124. The memory 2122 may store software and data through an appropriate internal or external device. The memory 2122 may be configured as a memory device connected to a random access memory (RAM), a read only memory (ROM), a hard disk, and a dongle.

The memory 2122 may store at least an operating system (OS), a user application, and executable instructions. The memory 2122 may also store application data and array data structures.

The processor 2124, as a microprocessor or a suitable electronic processor, may be a controller, a microcontroller, or a state machine.

The processor 2124 may be implemented as a combination of computing devices, and the computing device may be configured as a digital signal processor, a microprocessor, or a suitable combination thereof.

Meanwhile, the autonomous vehicle 2000 may further include the user interface 2008 for user inputting for the control device 2100 described above. The user interface 2008 may allow a user to input information through appropriate interaction. For example, the user interface 2008 may be implemented as a touch screen, a keypad, and an operation button. The user interface 2008 may transmit an input or command to the controller 2120, and the controller 2120 may perform a vehicle control operation in response to the input or command.

In addition, the user interface 2008 may allow a device outside the autonomous vehicle 2000 to communicate with the autonomous vehicle 2000 through the wireless communication device 2130. For example, the user interface 2008 may interwork with a mobile phone, a tablet, or other computer devices.

Furthermore, in the present exemplary embodiment, the autonomous vehicle 2000 has been described as including the engine 2006, but the autonomous vehicle 200 may include other types of propulsion systems. For example, a vehicle may be driven by electric energy and may be driven by hydrogen energy or a hybrid system combining them. Accordingly, the controller 2120 may include a propulsion mechanism according to a propulsion system of the autonomous vehicle 2000 and provide a control signal according to the propulsion system to components of each propulsion mechanism.

Figure 15:
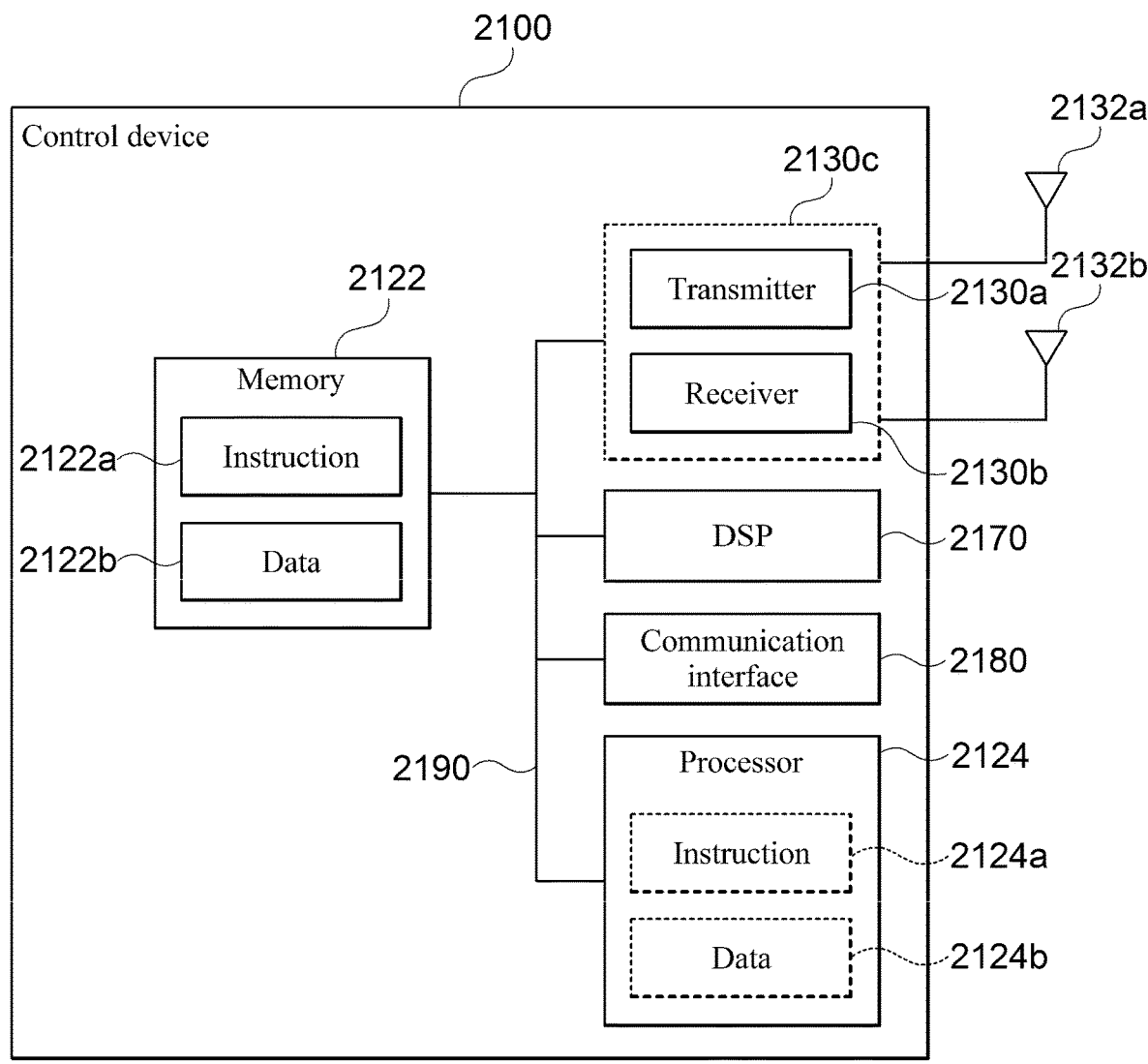
FIG. 15 is a block diagram illustrating a configuration of an autonomous vehicle according to an exemplary embodiment of the present invention.

Hereinafter, a detailed configuration of the control device 2100 according to an exemplary embodiment of the present disclosure will be described in more detail with reference to FIG. 15.

The control device 2100 includes a processor 2124. The processor 2124 may be a general purpose single or multi-chip microprocessor, a dedicated microprocessor, a microcontroller, a programmable gate array, or the like. The processor may also be referred to as a central processing unit (CPU). In addition, in the present exemplary embodiment, the processor 2124 may be used as a combination of a plurality of processors.

The control device 2100 also includes the memory 2122. The memory 2122 may be any electronic component capable of storing electronic information. The memory 2122 may also include a combination of memories 2122 in addition to a single memory.

Data and instructions 2122a for performing the lane marking detecting method according to the present invention may be stored in the memory 2122. When the processor 2124 executes the instructions 2122a, all or some of the instructions 2122a and data 2122b required for execution of the instructions 2124a and 2124b may be loaded onto the processor 2124.

The control device 2100 may include a transmitter 2130a, a receiver 2130b, or a transceiver 2130c for allowing transmission and reception of signals. One or more antennas 2132a and 2132b may be electrically connected to the transmitter 2130a, the receiver 2130b, or each transceiver 2130c, and may additionally include antennas.

The control device 2100 may include a digital signal processor (DSP) 2170. A digital signal may be quickly processed by the vehicle through the DSP 2170.

The control device 2100 may also include a communication interface 2180. The communication interface 2180 may include one or more ports and/or communication modules for connecting other devices to the control device 2100. The communication interface 2180 may allow a user and the control device 2100 to interact with each other.

Various components of the control device 2100 may be connected together by one or more buses 2190, and the buses 2190 may include a power bus, a control signal bus, a state signal bus, a data bus, and the like. Under the control of the processor 2124, the components may transmit mutual information through the bus 2190 and perform a desired function.

According to the various exemplary embodiments of the present invention described above, both linear lane marking and a curved lane marking may be accurately detected from a drive image captured while a vehicle is running.

Further, according to various exemplary embodiments of the present invention, since a linear component is used as a main element, misrecognition due to a vehicle of a next lane and other obstacles may be reduced and both a linear lane marking and a curved lane marking may be accurately detected.

In addition, according to various exemplary embodiments of the present invention, since a vehicle accurately recognizes a lane marking of a lane on which a vehicle is running, an AR guidance object (e.g., a route guidance object and a lane departure guidance object) displayed based on a lane marking may be displayed realistically on an AR screen.

In addition, according to various exemplary embodiments of the present invention, a lane marking may be accurately recognized and a lane marking-based AR guidance object may be displayed on an AR screen even in an environment in which route line data cannot be provided or route line data is not established according to national characteristics in countries such as China.

In addition, according to the present invention, since a vehicle accurately recognizes a lane marking of a lane on which the vehicle is running, a problem of autonomous driving error due to misrecognition of a lane marking may be solved.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method. For example, the first component may be referred to as a second component, and similarly, the second component may be referred to as a first component, without departing from the scope of the present invention.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

Meanwhile, when it is mentioned that any component is "directly coupled" or "directly connected" to another component, it is to be understood that any component may be coupled or connected to the other element without another component interposed therebetween.

In addition, terms "module" and "unit" for components used in the present specification are used only in order to easily make the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A collision avoidance method of a moving body collision avoidance device, the collision avoidance method comprising:
   acquiring a driving image captured by an image capturing device, wherein the driving image includes at least one of an object;
   recognizing the object in the acquired driving image using a neural network model, wherein the neural network model recognizes the object in the driving image, and outputs a bounding box indicating an object area in the driving image and a classification result for an object in the bounding box;
   generating a virtual horizontal line in the driving image based on average vertical coordinates of a plurality of bounding boxes in the driving image and an actual height of the image capturing device capturing the driving image;
   calculating a relative distance between the moving body and the object using the generated virtual horizontal line;
   calculating a required collision time between the object and the moving body based on the calculated relative distance; and
   controlling an operation of the moving body based on the calculated required collision time.

2. The collision avoidance method of claim 1, further comprising:
   tracking a change in position of the object recognized in the driving image to track a movement of the object.

3. The collision avoidance method of claim 2, further comprising:
   normalizing the driving image in which the object is recognized.

4. The collision avoidance method of claim 1, further comprising:
   determining a position state of objects recognized in the driving image; and
   determining the object to be tracked among the objects recognized in the driving image based on the position state according to types of the objects.

5. The collision avoidance method of claim 1, wherein the calculating of the relative distance includes calculating an estimated relative distance based on the generated virtual horizontal line and a vertical coordinate of a bottom surface of the bounding box.

6. The collision avoidance method of claim 1, wherein the calculating of the relative distance includes calculating the estimated relative distance based on a vertical height of the bounding box and an actual height of the object.

7. The collision avoidance method of claim 6, wherein the calculating of the relative distance includes calculating the relative distance through prediction and updating by applying the calculated estimated relative distance to a Kalman filter.

8. The collision avoidance method of claim 1, wherein the calculating of the required collision time includes calculating the required collision time in consideration of a speed of the moving body.

9. The collision avoidance method of claim 1, wherein the controlling of the operation includes providing a collision warning guidance or control the moving body to be braked when there is a possibility of colliding with the object.

10. A moving body collision avoidance device comprising:
    a processor acquiring a driving image captured by an image capturing device, wherein the driving image includes at least one of an object;
    the processor recognizing the object in the acquired driving image using a neural network model,
    wherein the neural network model recognizes the object in the driving image, and outputs a bounding box indicating an object area in the driving image and a classification result for an object in the bounding box;
    the processor generating a virtual horizontal line in the driving image based on average vertical coordinates of a plurality of bounding boxes in the driving image and an actual height of the image capturing device capturing the driving image, calculating a relative distance between the moving body and the object using the generated virtual horizontal line and calculating a required collision time between the object and the moving body based on the calculated relative distance; and
    a controller controlling an operation of the moving body based on the calculated required collision time.

11. The moving body collision avoidance device of claim 10, further comprising:
    the processor tracking a change in position of the object recognized in the driving image to track a movement of the object.

12. The moving body collision avoidance device of claim 10, further comprising:
    the processor determining a position state of the object recognized in the driving image; and
    the processor excluding an object having a low possibility of colliding with the moving body from a tracking target based on the position state according to a type of the object.

13. The moving body collision avoidance device of claim 10, wherein the processor calculates an estimated relative distance based on the generated virtual horizontal line and a vertical coordinate of a bottom surface of the bounding box.

14. The moving body collision avoidance device of claim 10, wherein the processor calculates an estimated relative distance based on a vertical height of the bounding box and an actual height of the object.

15. The moving body collision avoidance device of claim 10, wherein the processor calculates the required collision time in consideration of a speed of the moving body.

16. An electronic device for a moving body, the electronic device comprising:
    a processor capturing a driving image;

the processor acquiring a driving image captured by the the processor, wherein the driving image includes at least one of an object;

the processor recognizing the object in the acquired driving image using a neural network model, wherein the neural network model recognizes the object in the driving image, and outputs a bounding box indicating an object area in the driving image and a classification result for an object in the bounding box;

the processor generating a virtual horizontal line in the driving image based on average vertical coordinates of a plurality of bounding boxes in the driving image and an actual height of the processor capturing the driving image, calculating a relative distance between the moving body and the object using the generated virtual horizontal line and calculating a required collision time between the object and the moving body based on the calculated relative distance; and a display or a speaker outputting information for guiding driving of the moving body based on the calculated required collision time.

\* \* \* \* \*